(12) United States Patent
Gouko et al.

(10) Patent No.: US 7,700,011 B2
(45) Date of Patent: Apr. 20, 2010

(54) DISK FORMING METHOD

(75) Inventors: Takeshi Gouko, Miyagi (JP); Kenji Echizen, Miyagi (JP); Mikio Sato, Miyagi (JP); Akio Koshita, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/130,062

(22) Filed: May 30, 2008

(65) Prior Publication Data

US 2008/0230955 A1   Sep. 25, 2008

Related U.S. Application Data

(62) Division of application No. 11/380,672, filed on Apr. 28, 2006.

(30) Foreign Application Priority Data

Apr. 28, 2005   (JP) ............... 2005-132605

(51) Int. Cl.
  *B29C 33/38*   (2006.01)
  *B29C 45/00*   (2006.01)
(52) U.S. Cl. ............... 264/1.33; 264/2.5; 264/328.1
(58) Field of Classification Search ............ 264/328.1, 264/2.5, 1.33, 106, 107; 425/810
  See application file for complete search history.

(56) References Cited

U.S. PATENT DOCUMENTS

| 3,306,855 | A | * | 2/1967 | Borecki ............... 508/431 |
| 4,681,693 | A | | 7/1987 | Gavezotti et al. |
| 4,758,471 | A | | 7/1988 | Arioka et al. |
| 4,921,890 | A | | 5/1990 | Hayashi et al. |
| 5,663,127 | A | | 9/1997 | Flynn et al. |
| 6,303,227 | B1 | | 10/2001 | Kuwahara et al. |
| 6,333,089 | B1 | | 12/2001 | Hirata et al. |
| 6,403,149 | B1 | | 6/2002 | Parent et al. |
| 6,514,437 | B1 | | 2/2003 | Higashida et al. |
| 6,809,069 | B2 | | 10/2004 | Deshimaru et al. |
| 7,294,294 | B1 | | 11/2007 | Wago et al. |
| 2001/0056051 | A1 | | 12/2001 | Tei et al. |
| 2004/0227263 | A1 | | 11/2004 | Gorczyca et al. |

FOREIGN PATENT DOCUMENTS

JP   6-33391   2/1994

OTHER PUBLICATIONS

David Godwin; Lubricant Selection and Application A Primer; Metal Forming; Jan. 2004.

* cited by examiner

*Primary Examiner*—Jill L Heitbrink
(74) *Attorney, Agent, or Firm*—Sonnenschein Nath & Rosenthal LLP

(57) ABSTRACT

A boundary lubricant film 1 is formed on a stamper 22 contact portion of a stationary mirror 21 and/or a stationary mirror 21 contact portion of the stamper 22. The boundary lubricant film 1 contains one of kinds of phosphate esters. A material is injected into a cavity 14. As a result, a disc substrate for an optical disc is molded.

1 Claim, 15 Drawing Sheets

DISK FORMING METHOD

RELATED APPLICATION DATA

This application is a divisional of U.S. patent application Ser. No. 11/380,672, filed Apr. 28, 2006, the entirety of which is incorporated herein by reference to the extent permitted by law. The present invention claims priority to Japanese Patent Application No. 2005-132605 filed in the Japanese Patent Office on Apr. 28, 2005, the entirety of which also is incorporated by reference herein to the extent permitted by law.

BACKGROUND OF THE INVENTION

1. Field of the Invention

The present invention relates to a lubricant composition, an article, a disk molding stamper, a disk molding apparatus, a disk forming method and a method of forming lubrication coating.

2. Description of the Related Art

Conventionally, a disc substrate for an optical disc is molded by a molding apparatus having a mold 101 as shown in FIG. 15. The mold 101 has for example two mold members made of a steel material such as stainless steel. The mold members are a stationary mold member 102 and a movable mold member 103. The movable mold member 103 can be opened. The stationary mold member 102 has a stationary mirror 121. The stationary mirror 121 has a concave and convex shaped stamper 122 which transfers a concave and convex information signal such as lands/grooves or pits of an optical disc. In the stationary mold member 102, a sprue bush 123 with which resin as a material of a disc substrate is injected is formed.

A disc substrate is molded by the mold 101 for example in the following manner. After the stamper 122 is mounted on the stationary mirror 121, the movable mold member 103 is moved toward the stationary mold member 102. Thereafter, the mold 101 is closed. Resin is injected into a cavity 114 which is a space portion formed between the stationary mold member 102 and the movable mold member 103 through the sprue bush 123. A concave and convex shape formed on the stamper 122 is transferred to the resin. After the concave and convex shape is transferred, the injected resin is cooled. After the injected resin is cooled, the movable mold member 103 is opened. After the movable mold member 103 is opened, resin in the sprue bush 123 and a molded substance as a disc substrate in the sprue bush 123 are ejected by an ejector 130 so that the molded substance is peeled off from the movable mold member 103. After an eject operation of the ejector 130 for the molded substance is finished, the disc substrate is transferred to the outside of the molding apparatus by an unloader (not shown).

In a sequence of molding steps, when molten resin is injected into the cavity 114 through the sprue bush 123, tensile stress radially works due to viscosity of the resin and thermal stress works due to repeated heating and cooling on the stamper 122. On the other hand, tensile stress due to viscosity of resin and thermal stress do not almost work on the stationary mirror 121. Thus, these stresses cause frictional force to work between the stationary mirror 121 and the stamper 122 in the radial direction. As a result, contact portions of the stamper 122 and the stationary mirror 121 wear out.

This wear is called adhesion wear and causes the front surface of the stationary mirror 121 or the rear surface of the stamper 122 to wear out. In other words, the contact surfaces of the stamper 122 and the stationary mirror 121 are microscopically not perfect planes. Thus, the contact surfaces have a concave and convex portion. The concave and convex portion causes the front surface of the disc substrate to be formed in a concave and convex shape and frictional force between the stamper 122 and the stationary mirror 121 to increase. The increased frictional force prevents the stamper 122 to expand and shrink. In the disc substrate formed in such a state, address pits deform, which result in address errors, and roundness of lands/grooves deteriorates, which results in servo errors. If the disc substrate does not satisfy these allowable ranges, the disc substrate is treated as a defective item. As a result, the yield decrease.

Thus, normally, coating is applied to the stationary mirror 121 so as to decrease frictional force of the contact portions of the stamper 122 and stationary mirror 121. The mainstream of the coating is DLC (diamond like carbon) coating of an amorphous carbon film containing hydrogen. The DLC has characteristics similar to those of diamond. The DLC coating can suppress an increase of fictional force due to adhesion wear in comparison with conventional coating of titanium nitride (TiN) or the like. A technology of which a hard film made of DLC is formed on a mold contact surface of a stamper is disclosed in for example Japanese Patent Application Unexamined Publication No. HEI 10-64127, Paragraph [0045].

In recent years, high density optical discs have been developed. For example, a 3.5-inch MO (Magnet Optical) disc accomplishes a record capacity of 2.3 GB using a combination of MSR (Magnetically inducted Super Resolution) technology and land/groove combined record technology. In addition, DVD (Digital Versatile Disc) can record and reproduce data with a high speed record density of 16× speed.

When disc substrates for these high density optical discs are successively molded, since a concave and convex shape transferred by the stamper gradually deteriorates due to the foregoing adhesion wear. Thus, before the characteristics of optical discs exceed the allowable range of the predetermined address error or servo error, it is necessary to abrade the rear surface of the stamper or replace it with good one. Since abrasion or replacement of the stamper takes a time, the productivity remarkably lowers. Thus, it is preferred to reduce as much frictional force which occurs between the stamper and the mold as possible to reduce the abrasion work or replacement work for the stamper.

However, with only the hard film formed between the stamper and the mold, frictional force occurring between the stamper and the mold was not sufficiently decreased. When the foregoing 3.5-inch MO discs were molded for around 20,000 shots, the characteristics of the optical discs exceeded the allowable range of address error.

When oil such as wax or lubrication oil is applied to the stamper contact portion of the mold and/or the mold contact portion of the stamper, frictional force which occurs between the stamper and the mold can be decreased.

However, oil such as wax does not have heat resistance. When oil is used under high temperature environment for a long time, it loses stability. When oil is further heated, moisture is lost therefrom. The moisture adversely affects the stamper and the mold. As a result, the quality of the molded substance deteriorates. In addition, it is difficult to equally apply oil such as wax and lubrication oil on the front surface of the mold. Thus, oil and lubrication oil do not have reproducibility. In addition, since oil such as wax and lubrication oil have high viscosity, they tend to catch foreign matter such as dust. As a result, the quality of the molded substance deteriorates.

Lubricant applied between the stamper and the mold has necessity for the following characteristics to reduce frictional force occurring therebetween. (1) Lubricant does not change in appearance and is dry. (2) Lubricant has solvent resistance. (3) Lubricant is strongly absorbed into the rear surface of the stamper or by a material that composes the signal mirror portion. (4) Lubricant does not change the roughness of a surface on which the treatment agent was coated. (5) Lubricant has heat resistance. (6) Under high temperature and high pressure environment, lubricant maintains frictional reduction effect. Next, the characteristics (1) to (6) will be described in detail.

(1) First, lubricant does not change in appearance and is dry. It is not preferred that the entire rear surface of the stamper be oily and wet because dust in the air adheres to the stamper and foreign matter adheres to the stamper that is handled. In addition, when the stamper is wet, lubricant may be present as liquid on the rear surface. A signal surface may be contaminated with treatment agent of lubricant due to high pressure applied when a disc substrate is molded. As a result, lubricant adversely affects the quality of the disc substrate. In addition, lubricant may adhere to the molding apparatus itself. Thus, it is necessary to keep the front surface treated with lubricant dry.

(2) In addition, lubricant has solvent resistance. When the stamper is mounted on the mold of the molding apparatus, the rear surface of the stamper and the signal mirror portion of the mold of the molding apparatus are wiped and cleaned with volatile organic solvent. This wiping and cleaning are ordinarily performed to prevent foreign matter from being transferred to the stamper and the signal record portion of the optical disc substrate and to prevent them from being oil contaminated. Volatile solvent used in this case is for example one of kinds of ketones such as acetone, methyl ethyl ketone (MEK), or toluene or one of kinds of alcohols such as ethyl alcohol or isopropyl alcohol (IPA). Among them, acetone or methyl ethyl ketone (MEK) is mainly used. When they are wiped with such a highly dissolvable solvent, most surface active agents, lubricants, resins, and so forth are dissolved. As a result, they are lost from the coated or treated surface. Thus, it is necessary to select a treatment agent that is not dissolvable in these solvents.

(3) In addition, lubricant is strongly absorbed into the rear surface of the stamper or by a material that composes the signal mirror portion. It is necessary to equally and chemically absorb the lubricant on the front surface although it depends on solvability. When one of silicone resins and fluoride resins which have frictional reduction effect is used, they are physically absorbed into the rear surface of the stamper and the signal mirror portion. Thus, when they are wiped, these resins are easily removed. Thus, it is difficult to equally form a film of lubricant. In addition, the treatment agent is transferred to the opposite member. As a result, the effect of the lubricant is not maintained for a long time.

(4) In addition, lubricant does not change the roughness of a surface on which the treatment agent was coated. When the surface roughness deteriorates, the deteriorated roughness may be transferred to the stamper and the signal record portion of the optical disc substrate under high temperature and high pressure environment. As a result, they may be adversely affected. Although PTFE (polytetrafluoro-ethylene), graphite/molybdenum disulfide solid lubricants, and so forth have remarkable frictional reduction effect, they often deteriorate the surface roughness. Thus, it is difficult to practically use them. In addition, it is difficult to control solid lubricant for an equal film thickness. Thus, solid lubricant may not be used to mold optical discs that have necessity for large surface roughness. In addition, a graphite type lubricant and a molybdenum disulfide type lubricant are normally powder. Since powder drops from the treatment surface, it may be impossible to use them from a view point of quality.

(5) In addition, lubricant has heat resistance. When an optical disc substrate is molded, resin heated at around 400° C. is injected into the stamper. At this point, although the rear surface of the stamper and the signal mirror portion are quickly cooled, since optical disc substrates are successively molded, they are continuously heated at around 200° C. under high pressure. At this environmental temperature, the frictional reduction effect of most of surface-active agents and resins is lost by pyrolysis or the like.

(6) In addition, under high temperature and high pressure environment, lubricant maintains frictional reduction effect. It is most important for lubricant which reduces frictional force occurring between the stamper and the mold to satisfy this characteristic. Besides the fabrication of optical discs, the facility operating ratio of the fabrication site is very important from a view point of cost. When the facility is stopped and a maintenance work is performed, human mistake factors such as catching of foreign matter increase. As a result, the yield of optical discs is adversely affected. It is preferred that the facility be continuously operated as long as possible.

However, those in the field of the present invention know that it is very difficult to find lubricant that satisfies the characteristics (1) to (6). Thus, it has been desired to accomplish lubricant that satisfies the characteristics (1) to (6).

In addition, in recent years, it has been strongly desired to improve the productivity of high density optical record mediums such as DVD and quantitatively produce next generation high density optical record mediums such as BD. Under such a circumstance, it has been desired to accomplish lubricant that satisfies the characteristics (1) to (6).

SUMMARY OF THE INVENTION

Therefore, an object of the present invention is to provide a lubricant composition that does not change in appearance and is dry, has solvent resistance, is strongly absorbed into a material that composes a rear surface of a stamper, a signal mirror portion, and so forth, does not change the roughness of a surface on which the treatment agent is coated, has heat resistance, and maintains frictional reduction effect under high temperature and high pressure environment; an article on which the lubricant composition is coated; a molding stamper for an optical disc substrate; a molding apparatus for an optical disc substrate; a method of molding an optical disc substrate; and a method of forming a lubricant film.

Another object of the present invention is to provide a lubricant composition that has excellent heat resistance, allows a lubricant film to be formed with high reproducibility to reduce frictional force occurring between the mold and the stamper and thereby the quality and productivity of optical discs to be improved and the production cost to be reduced; an article on which the lubricant composition is coated; a molding stamper for an optical disc substrate; a molding apparatus for an optical disc substrate; a method of molding an optical disc substrate; and a method of forming a lubricant film.

The inventors of the present invention intensively made researches to solve the foregoing problems of the related art. Next, results that the inventors obtained from the researches will be described.

The inventors conducted experiments to study lubricants. However, the inventors could not find lubricants that satisfy the foregoing characteristics (1) to (6). The inventors further intensively made researches for the lubricants. As a result, the inventors found the following materials in other than the field of optical record mediums.

In other words, the inventors found phosphate ester, which is used as an additive of an ink composition for a bubble ink jet printer. The inventors know that when the phosphate ester is added to an ink composition, the following functions and effects will be obtained. In the ink jet printer, a heater that forms liquid droplets is mainly made of tantalum. Since high temperature is applied to the heater, a problem called cogation occurs. In other words, an ink composition adheres as a deposit of dried ink to the metal surface. This cogation prevents temperature from being transferred. As a result, liquid droplets are not formed. When phosphate ester is added as an ink additive to the ink, the heater is surface treated with phosphate ester through the ink. It is thought that phosphate ester is chemically absorbed into the surface of the heater. Thus, the effect of heat resistance of phosphate ester occurs on the surface of the heater. As a result, the cogation protection effect is obtained.

As a result of experiments that the inventors conducted about phosphate ester as an additive, when phosphate ester is used as a lubricant rather than an additive in the related art, the inventors found that the lubricant satisfies the foregoing characteristics (1) to (6). More specifically, the inventors found that when phosphate ester diluted by solvent is coated on the signal mirror surface and the rear surface of the stamper, the lubricant satisfies the foregoing characteristics (1) to (6).

As a result that the inventors intensively made researches for phosphate ester, the inventors found that when a fluoride modified phosphate ester having a perfluoro-molecular structure is used, a higher frictional reduction effect and solvent resistance than phosphate ester can be obtained.

The present invention was made according to the foregoing researches.

To solve the foregoing problem, a first aspect of the present invention is a lubricant composition containing one of kinds of phosphate esters and having extreme pressure environmental resistance.

A second aspect of the present invention is an article coated with a lubricant composition containing one of kinds of phosphate esters and having extreme pressure environmental resistance.

A third aspect of the present invention is a molding stamper for an optical disc substrate having a lubricant film formed on a rear surface, the lubricant film containing one of kinds of phosphate esters, the rear surface contacting a mirror surface of a mold.

According to the third aspect of the present invention, since the lubricant film forming agent contains one of kinds of phosphate esters, the lubricant film formed on the stamper has excellent heat resistance.

A fourth aspect of the present invention is a molding apparatus for an optical disc substrate, the molding apparatus having a mold having a mirror surface on which a stamper is mounted; and a lubricant film formed on the mirror surface, the lubricant film containing one of kinds of phosphate esters.

According to the fourth aspect of the present invention, since the lubricant film forming agent contains phosphate ester, the lubricant film formed on the mirror surface has excellent heat resistance.

A fifth aspect of the present invention is a method of forming a lubricant film, the method having the steps of: coating a lubricant film forming agent containing one of kinds of phosphate esters on a substrate; and wiping the lubricant film forming agent coated on the substrate at the coating step with solvent that does not dissolve the lubricant film forming agent.

According to the fifth aspect of the present invention, it is supposed that when the lubricant film forming agent is coated on a substrate, the lubricant film forming agent is chemically absorbed into the substrate. Since the lubricant film forming agent contains one of kinds of phosphate esters, a lubricant film having excellent heat resistance can be formed on the substrate.

A sixth aspect of the present invention is a method of molding an optical disc substrate, the method having the steps of: forming a lubricant film on a stamper contact portion of a mold and/or a mold contact portion of the stamper, the lubricant film containing one of kinds of phosphate esters; mounting the stamper on the mold; and injecting a material into the mold on which the stamper has been mounted at the mounting step and molding a disc substrate.

According to the sixth aspect of the present invention, it is supposed that when a lubricant film forming agent is coated on the stamper contact portion of the mold and/or the mold contact portion of the stamper, the lubricant film forming agent is chemically absorbed into the stamper contact portion of the mold and/or the mold contact portion of the stamper. Since the lubricant film forming agent contains one of kinds of phosphate esters, a lubricant film having excellent heat resistance is formed at the stamper contact portion of the mold and/or the mold contact portion of the stamper.

According to the sixth aspect of the present invention, it is preferred that the one of kinds of phosphate esters contain at least one of mono-phosphate ester, di-phosphate ester, and tri-phosphate ester.

According to the sixth aspect of the present invention, it is preferred that a hard film be formed on the stamper contact portion of the mold and/or the mold contact portion of the stamper before the coating step is performed.

According to the sixth aspect of the present invention, it is preferred that a thickness of an agent which forms the lubricant film coated at the coating step be equalized before the mounting step is preformed. In addition, it is preferred that the thickness of the lubricant film be equalized by wiping a front surface of the lubricant film forming agent coated at the coating step with solvent which does not dissolve the lubricant film forming agent. Thus, the lubricant film can be equally, thinly, and reproducibly formed. In addition, unevenly coated lubricant film forming agent and foreign matter such as dust adhering to the coating surface can be removed.

According to the present invention, frictional force occurring between the mold and the stamper can be remarkably reduced. As a result, optical disc substrates having an excellent concave and convex portion can be produced. Thus, the quality and productivity of optical discs can be improved. In addition, since the rear surface of the stamper less wears, the life of the stamper is prolonged. As a result, the production cost can be suppressed.

BRIEF DESCRIPTION OF THE DRAWINGS

The invention will become more fully understood from the following detailed description, taken in conjunction with the accompanying drawings, wherein similar reference numerals denote similar elements, in which.

DETAILED DESCRIPTION OF THE PREFERRED EMBODIMENTS

Figure 1:
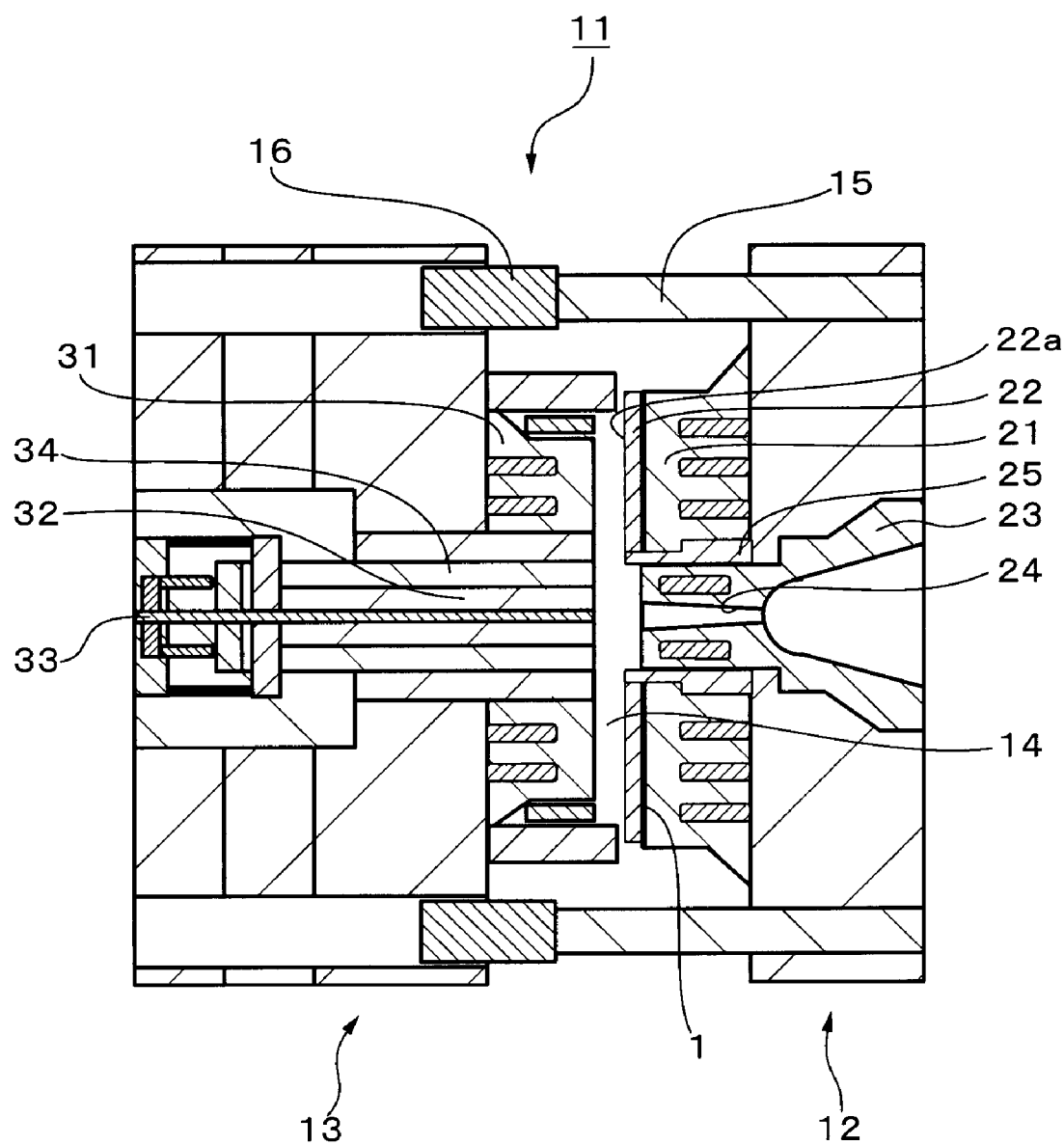
FIG. 1 is a sectional view showing an example of a structure of a molding apparatus according to a first embodiment of the present invention.

Next, an example of which the present invention is applied to a lubricant composition will be described. In all drawings that describe embodiments, similar or corresponding portions are denoted by similar reference numerals.

(1) First Embodiment

Structure of Molding Apparatus

Figure 2:
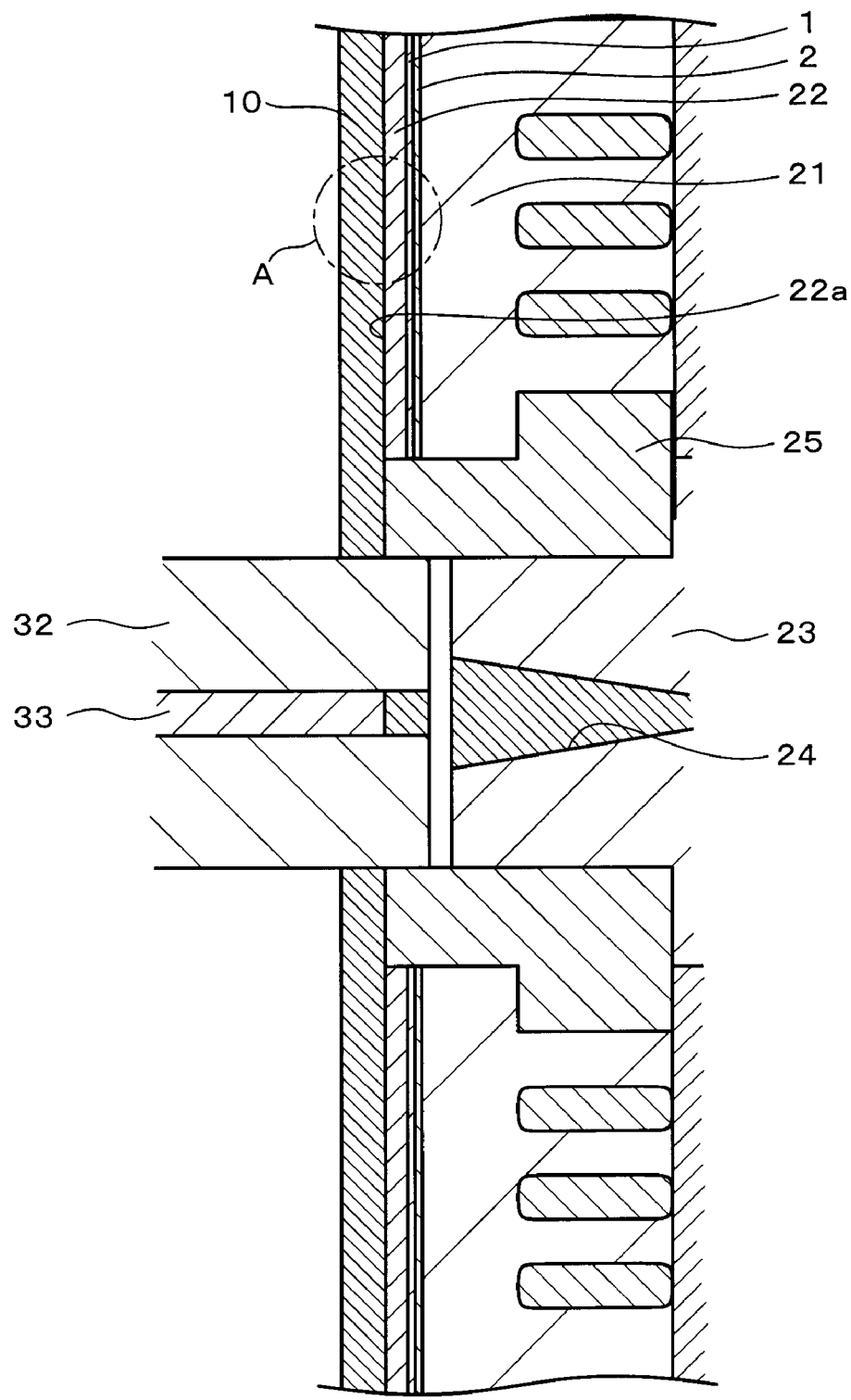
FIG. 2 is an enlarged sectional view showing the example of the structure of the molding apparatus according to the first embodiment of the present invention.

FIG. 1 is a sectional view showing an example of a structure of a molding apparatus 11 according to a first embodiment of the present invention. FIG. 2 is an enlarged sectional view showing the example of the structure of the molding apparatus 11 according to the first embodiment of the present invention.

As shown in FIG. 1, the molding apparatus 11 has a stationary mold member 12 and a movable mold member 13. When the stationary mold member 12 and the movable mold member 13 are fit, a cavity 14 that is a molding space is formed. In the molding apparatus 11, the cavity 14 is filled with molten disc substrate material. As a result, a disc substrate 10 is molded.

The stationary mold member 12 has a stationary mirror 21 that faces the movable mold member 13. A stamper 22 is mounted on the stationary mold member 12 so that the stamper 22 faces the cavity 14. The stamper 22 is formed in a doughnut shape having a center opening portion. One main surface 22a of the stamper 22 is formed in a concave and convex shape corresponding to lands/grooves, pits, or the like. The stamper 22 is mounted on the stationary mirror 21 of the stationary mold member 12 so that the main surface 22a faces the movable mold member 13. Deposited successively on the mirror surface of the stationary mirror 21 are a hard film 2 and a boundary lubricant film 1. The boundary lubricant film 1 and the hard film 2 will be described later.

Disposed nearly at the center of the stationary mold member 12 is a sprue bush 23. Formed at the center of the sprue bush 23 is a resin injection opening 24. The resin injection opening 24 is connected to a material supply unit (not shown). Molten disc substrate material is supplied from the material supply unit into the cavity 14 through the resin injection opening 24.

Disposed between the sprue bush 23 and the stationary mirror 21 is a stamper guide 25. The stamper guide 25 guides an inner peripheral portion of the stamper 22 when the stamper 22 is mounted on the stationary mirror 21.

On the other hand, the movable mold member 13 is disposed so that it faces the stationary mold member 12. The movable mold member 13 can be freely approached to and separated from the stationary mold member 12 by a guide pole 15 having a ball bearing at the tip. The movable mold member 13 has a movable mirror 31 that faces the stationary mold member 12. The movable mold member 13 has a gate cut punch 32 that cuts a center portion of a disc substrate 10 solidified in the cavity 14, an ejector pin 33 that ejects the center portion that was cut by the gate cut punch 32, and a moving side ejector 34 that ejects the disc substrate 10 from the movable mold member 13. The gate cut punch 32, the ejector pin 33, and the moving side ejector 34 are disposed nearly at the center of the movable side mold member 13.

The gate cut punch 32 cuts a runner portion or the like of the disc substrate material that has been supplied from the sprue bush 23 to the cavity 14 and solidified. The gate cut punch 32 has nearly the same outer diameter as the center hole of the optical disc. The gate cut punch 32 can be moved in the direction of which the gate cut punch 32 extends toward the cavity 14 by guide means and drive means (not shown).

The gate cut punch 32 and the sprue bush 23 are centered by the guide pole 15 having the ball bearing 16.

The ejector pin 33 has a rod shape. The ejector pin 33 is disposed at the center of the gate cut punch 32. The ejector pin 33 can be moved in the direction of which the ejector pin 33 extends towards the cavity 14 by guide means and drive means (not shown). The ejector pin 33 removes the portion that was cut by the gate cut punch 32. Thus, after the disc substrate material filled into the cavity 14 is solidified, when the ejector pin 33 is ejected, the runner portion and sprue, namely the runner portion and the disc substrate material that stay in the supply portion of the sprue bush 23, can be removed.

The moving side ejector 34 has a cylinder shape having nearly the same inner diameter as the outer diameter of the gate cut punch 32. The moving side ejector 34 surrounds the gate cut punch 32. The moving side ejector 34 can be moved in the direction of which the moving side ejector 34 extends towards the cavity 14 by guide means and drive means (not shown). Thus, after the cavity 14 is filled with the disc substrate material and the center hole of the disc substrate 10 is formed, the moving side ejector 34 pushes the inner periphery of the disc substrate 10 to eject the disc substrate 10 from the movable mold member 13.

Boundary Lubricant Film

Figure 3:
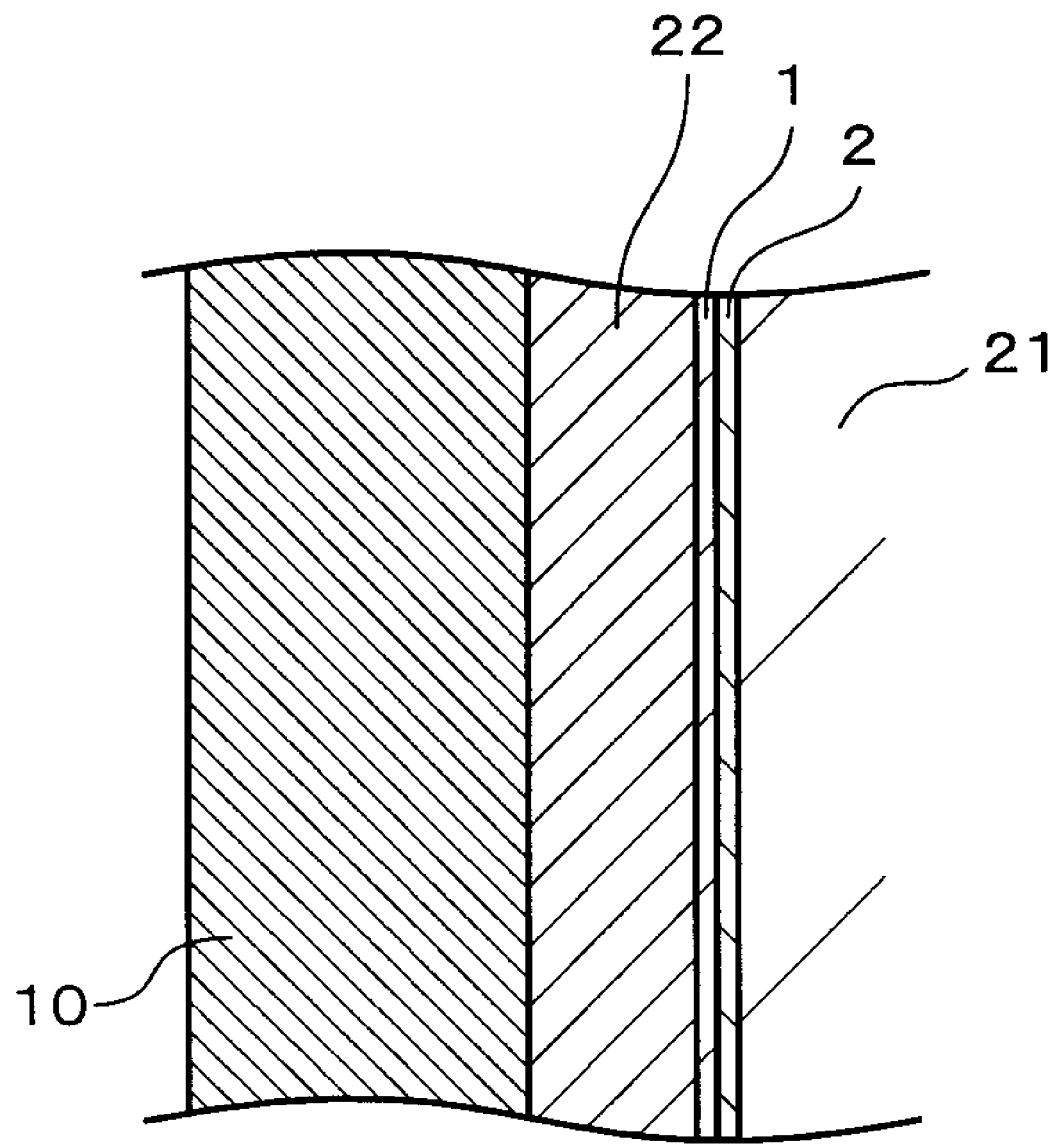
FIG. 3 is an enlarged sectional view showing a neighborhood portion of a front surface of a stationary mirror.

Next, the foregoing boundary lubricant film 1 will be described in detail. FIG. 3 is an enlarged view of a neighborhood portion A of the front surface of the stationary mirror 21 shown in FIG. 2. The front surface of the boundary lubricant film 1 has a plane shape that is the same as the rear surface of the stamper 22. The boundary lubricant film 1 has an equal thickness at least for a portion that contacts the stamper 22 on the mirror surface of the stationary mirror 21. Formed at least at the portion that contacts the stamper 22 on the mirror surface of the stationary mirror 21 is the hard film 2 by the DLC (Diamond like carbon) coating. The boundary lubricant film 1 is formed on the front surface of the hard film 2.

According to the first embodiment, as a material of the hard film 2, the DLC is used to reduce the frictional coefficient of the front surface. Instead, another hard material such as titanium nitride (TiN), chromium nitride (CrN), titanium carbon nitride (TiCN), titanium aluminum nitride (TiAlN), or TiKron (TiCrN) may be used. Instead, the boundary lubricant film 1 may be directly formed on the mirror surface of the stationary mirror 21 without the hard film 2.

Figure 4:
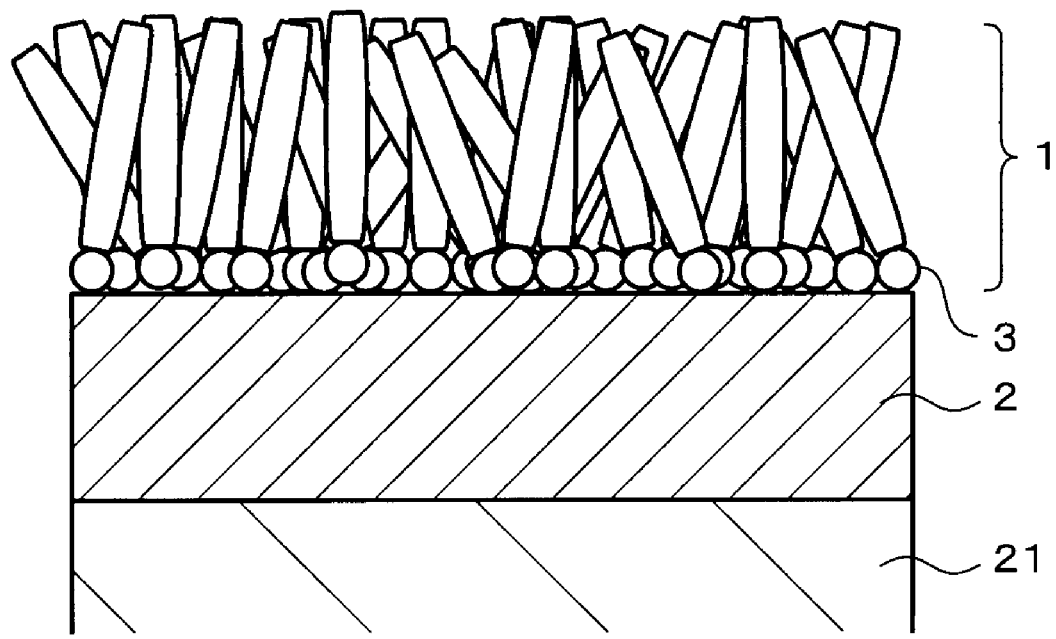
FIG. 4 is a schematic diagram showing an example of an absorbed state of a boundary lubricant film.

FIG. 4 is a schematic diagram describing an absorbed state of the boundary lubricant film 1. It is supposed that the boundary lubricant film 1 is chemically absorbed into the mirror surface of the stationary mirror 21 on which the hard film 2 is formed. When the boundary lubricant film agent of the stationary mirror 21 on which the hard film 2 is formed and an absorption site 3 is filled with the boundary lubricant film agent, it is supposed that no more boundary lubricant film agent is absorbed into the absorption site 3. Thus, when non-absorbed boundary lubricant film agent is removed, it is estimated that the thickness of the boundary lubricant film 1 is around 10 nm to 50 nm. The boundary lubricant film 1 is formed on the mirror surface of the stationary mirror 21 so that the surface roughness of the mirror surface of the stationary mirror 21 deteriorates.

The boundary lubricant film 1 is composed of a boundary lubricant film agent containing one of kinds of phosphate esters. One of kinds of phosphate esters is a mixture of for example mono-phosphate ester, di-phosphate ester, and tri-phosphate ester. Phosphate esters have excellent heat resistance. Phosphate esters are mainly used as an additive for a material such as fire retardant, which has necessity for heat resistance. More specifically, a phosphate ester is used as a dispersant for print ink of an ink jet printer.

The boundary lubricant film 1 is composed of for example a boundary lubricant film agent containing mono-phosphate ester, di-phosphate ester, and a small amount of tri-phosphate ester given by the following chemical formula (1), chemical formula (2) and chemical formula (3), respectively. In these chemical formulas, n denotes an average additional molarity of ethylene oxide (EO), R denotes an alkyl radical or alkyl aryl radical, R' denotes a metal salt such as H, Na, or K or $R(CH_2CH_2O)_n$ radical. Alkyl radical is $R=C_mH_{2m+1}$ where m denotes a carbon number, for example, m=6 to 18, n=0 to 10.

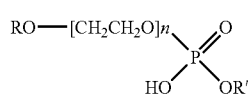

(1)

n: average additional molarity of ethylene oxide

R: alkyl radical or alkyl aryl radical

R': metal salt such as H, Na, or K, or $R(CH_2CH_2O)_n$ radical

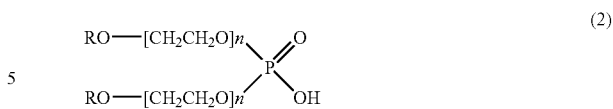

(2)

n: average additional molarity of ethylene oxide

R: alkyl radical or alkyl aryl radical

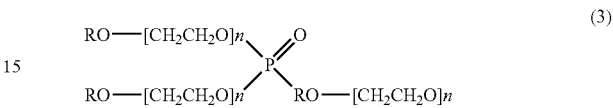

(3)

n: average additional molarity of ethylene oxide

R: alkyl radical or alkyl aryl radical

The boundary lubricant film agent may contain at least one of mono-phosphate ester, di-phosphate ester, and tri-phosphate ester given by the foregoing chemical formula (1), chemical formula (2), and chemical formula (3), respectively. When the boundary lubricant film 1 is composed of these boundary lubricant film agents, the boundary lubricant film 1 has excellent heat resistance, maintains stability of its components for a long time, contains no moisture, and exudes almost no moisture with heat.

Method of Forming Boundary Lubricant Film

Next, an example of a method of forming the boundary lubricant film 1 will be described. First, a boundary lubricant film agent is diluted with a solvent to a proper concentration. The kind of the solvent is not limited as long as it dissolves the boundary lubricant film agent. For example, an organic solvent such as toluene, benzene, or methyl ethyl ketone (MEK) may be used. Thereafter, the prepared boundary lubricant film agent is coated on the stationary mirror 21 with a coating tool such as waste cloth. Thereafter, the coated boundary lubricant film agent is wiped with a solvent that does not dissolve the boundary lubricant film agent. In this case, a cotton material such as waste cloth or Bemcot or chemical fibers are soaked with solvent that does not dissolve the boundary lubricant film agent. The coated boundary lubricant film agent is wiped with the cotton material or chemical fibers. It is preferred to use a solvent that is widely used to clean the stationary mirror 21 and/or the stamper 22. The solvent is for example acetone, ethanol, or a mixture thereof.

When the boundary lubricant film agent is wiped, foreign matter such as dust on the coating surface can be effectively removed. In addition, unevenly coated boundary lubricant film agent can be removed. As a result, the boundary lubricant film 1 that is very thin and free of foreign matter can be formed on the stationary mirror 21. In other words, in related art, it is difficult to coat oil and lubrication oil with an equal thickness on the front surface of the stationary mirror 21 with reproducibility. However, when the boundary lubricant film agent is wiped, it can be coated with an equal thickness on the stationary mirror 21 with reproducibility. In addition, oil and lubrication oil have high viscosity. When they are coated on the front surface of the stationary mirror 21, foreign matter such as dust tends to adhere to the front surface of the stationary mirror 21. In contrast, since the boundary lubricant film agent has low viscosity, foreign matter such as dust hardly adheres to the front surface of the stationary mirror 21. In addition, when the boundary lubricant film agent is wiped, foreign matter such as dust adhering to the coating surface can be removed.

Method of Molding Disc Substrate

Next, an example of a method of molding the disc substrate 10 using the molding apparatus 11 will be described. The movable mold member 13 is moved toward the stationary mold member 12 so that they are fit and the cavity 14 is formed. Thereafter, the cavity 14 is filled with a molten disc substrate material. The disc substrate material is for example a synthetic resin material such as polycarbonate. The disc substrate material is heated and melted in the material supply unit. The molten disc substrate material is supplied to the cavity 14 through the resin injection opening 24 as a supply path.

Thereafter, the disc substrate material filled in the cavity 14 is cooled and solidified. In addition, the disc substrate material is clamped. When the disc substrate material is clamped, the movable mold member 13 is further moved toward the stationary mold member 12. As a result, the disc substrate material filled in the cavity 14 is pressed. Thus, a concave and convex shape formed on the main surface 22a of the stamper 22 is securely transferred to the disc substrate material.

After the disc substrate material has been sufficiently cooled and solidified, the gate cut punch 32 is moved toward the stationary mold member 12, namely in the direction of which the gate cut punch 32 extends towards the cavity 14. When the gate cut punch 32 is moved in the direction of which the gate cut punch 32 extends toward the cavity 14, the runner portion and the sprue portion of the solidified disc substrate material can be cut. Thus, after the disc substrate material filled in the cavity 14 has been solidified, an opening is formed at the center thereof.

Thereafter, the movable mold member 13 is moved from the stationary mold member 12 in the direction of which the movable mold member 13 is separated from the stationary mold member 12. Thus, the disc substrate 10 is separated from the stamper 22 mounted on the stationary mold member 12. As a result, one main surface of the disc substrate 10 is exposed to the outside.

Thereafter, the ejector pin 33 is moved in the direction of which the ejector pin 33 extends toward the cavity 14. As a result, the portion that was cut by the gate cut punch 32 is removed. Thereafter, the moving side ejector 34 is moved in the direction of which the moving side ejector 34 extends toward the cavity 14. As a result, the inner peripheral portion of the disc substrate 10 is pushed and the disc substrate 10 is separated from the movable mold member 13. In the foregoing steps, the disc substrate 10 is molded.

The temperature of disc substrate material injected into the cavity 14 is in the range of around 360° C. to 390° C. Since phosphate esters have a lubricative characteristic in such a high temperature environment, the boundary lubricant film 1 reduces frictional force that occurs when the stamper 22 expands and shrinks. As a result, the stamper 22 and the stationary mirror 21 can be prevented from being deformed.

In addition, when the disc substrate 10 is molded, tensile stress due to viscosity of the disc substrate material filled in the cavity 14 and thermal stress due to repeated heating and cooling temperatures cause the stamper 22 to expand and shrink in the radial direction. At this point, the boundary lubricant film 1 formed on the stationary mirror 21 reduces frictional force due to expansion and shrinkage of the stamper 22 in the radial direction so as to prevent the stamper 22 and the stationary mirror 21 from being deformed.

Since the stamper 22 and the stationary mirror 21 are prevented from being deformed, the disc substrate 10 on which the concave and convex shape of the stamper 22 has been properly transferred is molded. The disc substrate 10 molded in such a manner can be used as a disc substrate for optical discs such as an MO disc and a DVD.

(2) Second Embodiment

Structure of Molding Apparatus

Figure 5:
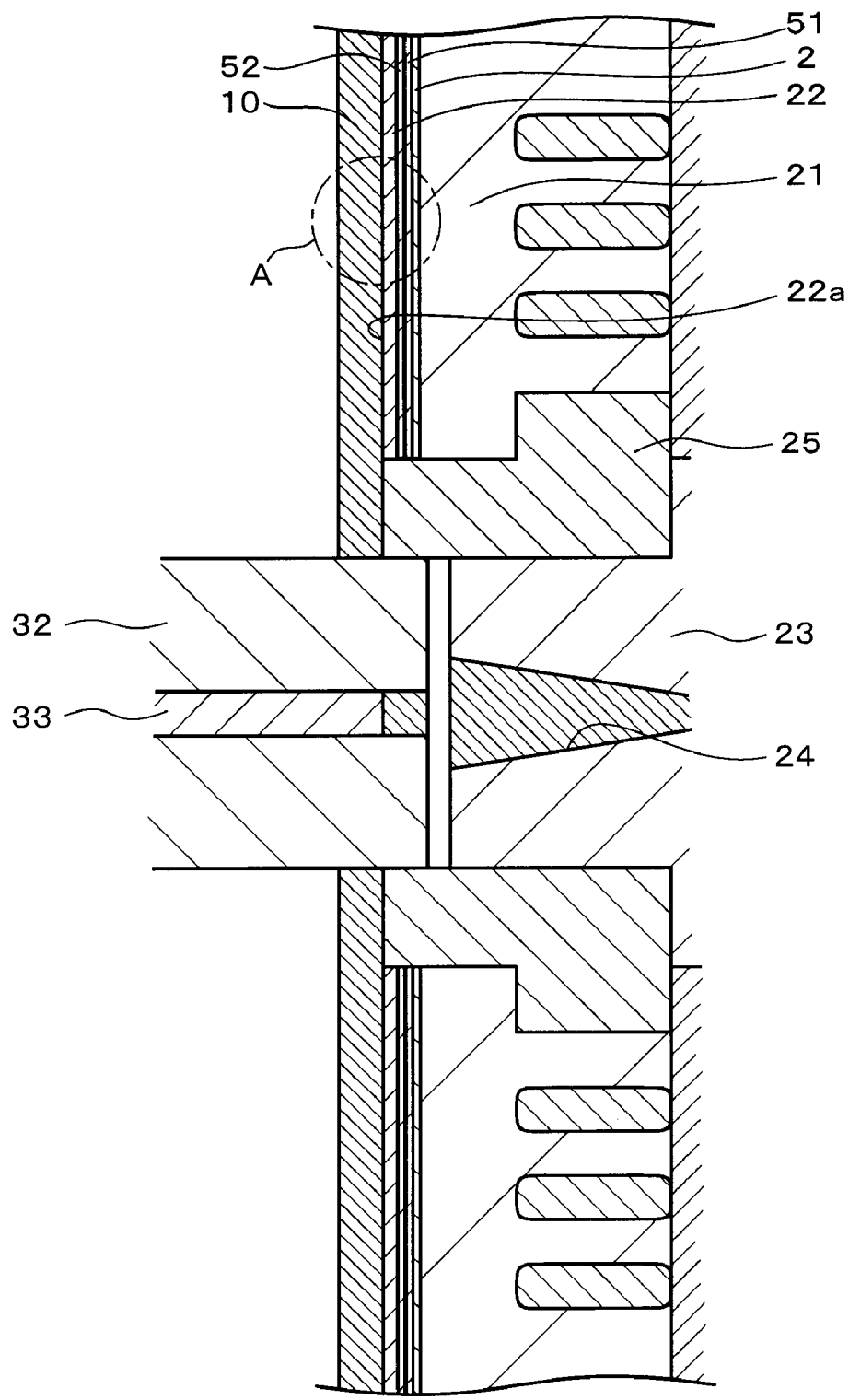
FIG. 5 is an enlarged sectional view showing the example of the structure of the molding apparatus according to the first embodiment of the present invention.
Figure 6:
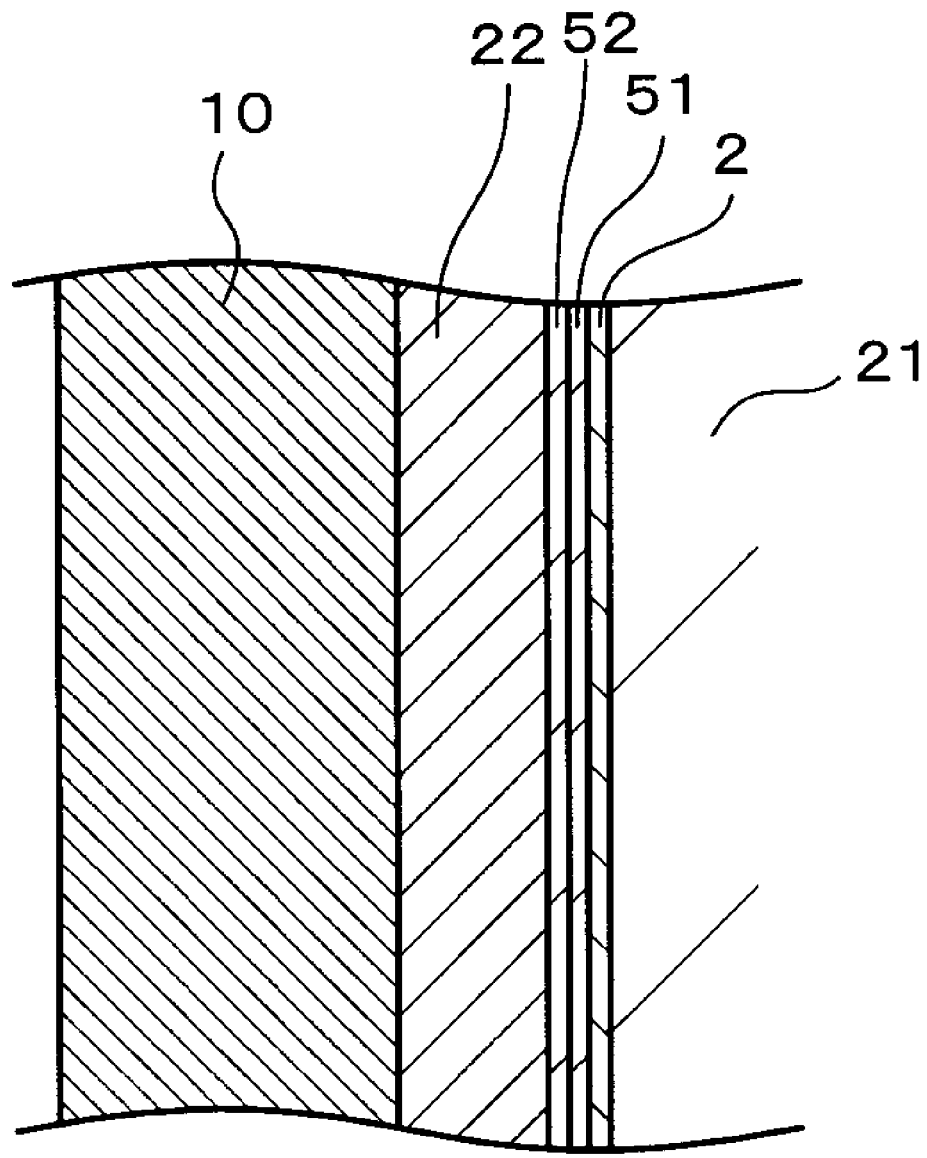
FIG. 6 is an enlarged view showing a neighborhood portion A of a front surface of a stationary mirror 21 shown in FIG. 5.

FIG. 5 is an enlarged sectional view showing an example of a structure of a molding apparatus according to a second embodiment of the present invention. FIG. 6 is an enlarged view showing a neighborhood A of a stationary mirror 21 shown in FIG. 5. As shown in FIG. 5 and FIG. 6, a boundary lubricant film 51 is formed on a mirror surface of the stationary mirror 21. A boundary lubricant film 52 is formed on a rear surface, which is an opposite surface of a signal surface, of the stamper 22. Since the structure of the molding apparatus of the second embodiment is the same as the structure of the molding apparatus of the first embodiment except for the boundary lubricant films 51 and 52, only the boundary lubricant films 51 and 52 will be described in the following.

The boundary lubricant films 51 and 52 each contain at least one kind of phosphate esters. As phosphate esters, for example mono-phosphate ester, di-phosphate ester, and tri-phosphate ester can be used. It is preferred to use fluoride modified phosphate ester having perfluoro-molecular structure. This is because fluoride modified phosphate ester allows the stamper life to be remarkably prolonged in comparison with mono-phosphate ester, di-phosphate ester, and tri-phosphate ester. In this specification, "life" means the number of optical discs that can be successively molded in one molding operation of a molding apparatus, namely the number of shots, rather than the stamper life.

Phosphate ester may be one of kinds of phosphate esters whose main components are mono-phosphate ester given by chemical formula (1) and di-phosphate ester given by chemical formula (2). In addition, phosphate ester may contain a small amount of tri-phosphate ester given by chemical formula (3). In addition, it is preferred to use fluoride modified phosphate ester for example given by chemical formula (4). The pH of typical phosphate ester is acid. However, a molecule of fluoride modified phosphate ester contains a phosphate ester radical. Fluoride modified phosphate ester can be neutralized to a proper pH with one selected from many kinds of alkaline compounds and metals. A phosphate ester has excellent heat resistance. Phosphate esters are mainly used as an additive for a material such as fire retardant, which has necessity for heat resistance. More specifically, phosphate esters are used as a dispersant for print ink of an ink jet printer.

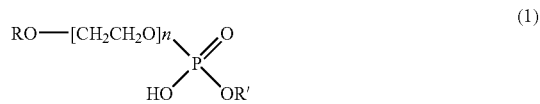

(1)

n: average additional molarity of ethylene oxide

R: alkyl radical or alkyl aryl radical

R': metal salt such as H, Na, K, or the like or $R(CH_2CH_2O)_n$ radical

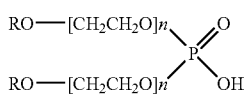

(2)

n: average additional molarity of ethylene oxide

R: alkyl radical or alkyl aryl radical

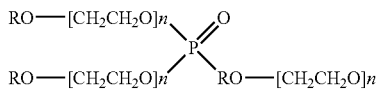

(3)

n: average additional molarity of ethylene oxide

R: alkyl radical or alkyl aryl radical $$[F-(CF_2CF_2CF_2O)_n-CF_2CF_2CH_2O]_m-PO(OH)_{3-m} \quad (4)$$

Method of Producing Stamper

Next, an example of a method of producing a master stamper (mastering step) will be described. First, with for example a dedicated abrading device, a disc-shaped glass master as a substrate with which a stamper is produced is scrubbed with fine abrasive such as cerium oxide. After the glass master becomes flat, it is carefully cleaned so that abrasive does not remain. Thereafter, a photoresist layer is formed on the glass master that has been abraded and cleaned. The photoresist layer becomes a base for a signal pattern transferred as grooves or pits formed on an optical disc.

Thereafter, the photoresist layer is radiated with a laser beam. A master pattern of the stamper which transfers the signal pattern to optical discs is exposed with the laser beam. Thereafter, the master pattern is developed. A metal base layer is formed on the master pattern by electroless plating. Thereafter, an electroplate film is formed for a desired stamper thickness by electrolyte plating.

Thereafter, the plated metal film on which the signal pattern (master pattern) has been copied is separated from the glass master. The photoresist layer is dissolved with a dedicated solvent. The plated metal film is cleaned and fully dried. As a result, the master for the stamper is obtained.

A protection sheet is adhered on the signal pattern surface of the stamper. Thereafter, the rear surface of the stamper is abraded so as to improve the flatness. To obtain a desired surface accuracy of the rear surface of the stamper, one of various abrasion methods may be selected. As was described above, as a method of abrading the rear surface of the stamper, free abrasion method that uses abrasive dispersed solution or a method that uses an abrasion tape, an abrasion pad (also referred to as abrasion disc), or any of various abrasion methods may be used. In other words, the rear surface of the stamper may be abraded by any method. Finally, the stamper is punched for a predetermined stamper diameter (trimmed). As a result, a desired stamper is obtained.

Preparing Boundary Lubricant Film Agent

When phosphate ester is used as a boundary lubricant film agent, phosphate ester is prepared in the following manner. Phosphate ester is diluted with a solvent such as an organic solvent for example toluene, benzene, or methyl ethyl ketone (MEK) to a proper concentration. When a metal salt such as potassium or sodium is used, pure water may be used as a solvent. More specifically, toluene is used as a solvent. Phosphate ester is diluted to a concentration of 5 wt %. Although the concentration of the boundary lubricant film agent is not restricted, the concentration is preferably in the range from 0.1 wt % to 10 wt %, more preferably, in the range from 2 wt % to 5 wt %. When the concentration is 0.1 wt % or higher, the effect of a boundary lubricant film is obtained. When the concentration is 10 wt % or lower, the boundary lubricant film can be equally formed. As a result, occurrence of interference fringes can be suppressed on the front surface. In addition, phosphate ester can be prevented from depositing as a solid component. When the concentration is 2 wt % or higher, the effect of the boundary lubricant film can be more improved. When the concentration is 5 wt % or lower, the uniformity of the boundary lubricant film can be more improved. As a result, occurrence of interference fringes can be more suppressed on the front surface. In addition, phosphate ester can be further prevented from depositing as a solid component.

Next, the prepared phosphate ester is placed in a screw tube or a large glass tube or poly-bin and then gently shaken several times. Thereafter, the tube, which contains the prepared phosphate ester, is rotated on for example a roll mill for around 10 minutes to one hour. However, the time for which the tube is rotated on the roll mill is not limited as long as it can be visually checked that the boundary lubricant film agent has been dissolved in a dilution solvent. As a result, a desired boundary lubricant film agent is obtained. In addition, when necessary, the obtained boundary lubricant film agent may be filtered by a membrane filter or the like. The size of the filter is not limited. Thus, the boundary lubricant film agent can be easily prepared. At the production site, a desired amount of boundary lubricant film agent can be produced.

When fluoride modified phosphate ester is used as a boundary lubricant film agent, fluoride modified phosphate ester is prepared in the following manner. From a view point of frictional reduction effect, it is preferred to use fluoride modified phosphate ester as a boundary lubricant film agent.

Fluoride modified phosphate ester is diluted with a solvent to a proper concentration in the same manner as the foregoing phosphate ester. From a view point of dissolvability, a fluoride solvent is used to dilute fluoride modified phosphate ester. For example, perfluorohexane, polyoxy perfluoro-n-alkylene, or hydrofluoroether can be used. More specifically, fluoride modified phosphate ester is diluted with hydrofluoroether as a solvent to a concentration of 0.5 wt %. Although the concentration of boundary lubricant film agent is not limited, it is preferred that the concentration be in the range from 0.01 wt % to 10 wt %, more preferably in the range from 0.3 wt % to 2.0 wt %. When the concentration is 0.01 wt % or higher, the effect of the boundary lubricant film can be obtained. When the concentration is 10 wt % or lower, the boundary lubricant film can be equally formed. As a result, occurrence of interference fringes on the front surface can be suppressed. In addition, deposition of a solid component of phosphate ester can be suppressed. When the concentration is 0.3 wt % or higher, the effect of the boundary lubricant film can be more improved. When the concentration is 2.0 wt % or lower, the boundary lubricant film can be more equally formed. Occurrence of interference fringes on the front surface can be further suppressed. Although the molecular weight of fluoride modified phosphate ester is not limited, it is preferably in the range from 2000 to 5000.

Next, the prepared fluoride modified phosphate ester is placed in a screw tube or a large glass tube or poly-bin and then gently shaken several times. Thereafter, the tube, which contains the prepared fluoride modified phosphate ester, is rotated on for example a roll mill for around 10 minutes to one hour. However, the time for which the tube is rotated on the roll mill is not limited as long as it can be visually checked that the boundary lubricant film agent has been dissolved in a dilution solvent. As a result, a desired boundary lubricant film agent is obtained. In addition, when necessary, the obtained boundary lubricant film agent may be filtered by a membrane filter or the like. The size of the filter is not limited. Thus, the boundary lubricant film agent can be easily prepared. At the production site, a desired amount of boundary lubricant film agent can be produced.

Method of Treating Rear Surface of Stamper

Next, an example of a method of treating the rear surface of the stamper will be described. A protection sheet is adhered to a signal surface of the stamper. Instead, resin or the like is spin-coated as a protection film on the signal surface of the stamper. Thereafter, a predetermined abrasion treatment is performed on the rear surface of the stamper. Thereafter, the rear surface of the stamper is degreased and cleaned with an organic solvent such as acetone, toluene, or ether alcohol. Thereafter, the boundary lubricant film agent that has been diluted to the predetermined concentration is dripped for a predetermined amount on the rear surface of the stamper by for example spin coating method so that the boundary lubricant film agent is equally coated on the entire rear surface of the stamper.

The boundary lubricant film agent may be formed on the rear surface of the stamper by other than the spin coating method. As another simple coating method, a proper amount of boundary lubricant film agent may be soaked into waste cloth or commercial Bemcot. The boundary lubricant film agent is directly coated on the rear surface of the stamper with the waste cloth or Bemcot. At this point, it is necessary to prevent the boundary lubricant film agent from flowing to the signal surface, which is the front side, of the stamper. In addition, it is important to clean the waste cloth and Bemcot. As an important point in the surface treatment, it is necessary to coat the boundary lubricant film agent on a clean surface. In addition, as a coating method, the stamper may be directly dipped in the boundary lubricant film agent, namely dipping method, may be used as long as the boundary lubricant film agent is prevented from flowing to the signal surface of the stamper.

After the boundary lubricant film agent is coated on the rear surface of the stamper, the stamper is dried at a normal temperature or heated by an oven or the like so that the solvent is perfectly evaporated. As a result, the boundary lubricant film agent is adhered to the rear surface of the stamper. Thus, the boundary lubricant film is formed on the rear surface of the stamper. When the solvent is dried by an oven or the like, the heating temperature is preferably near the boiling temperature of the dilution solvent. Although the drying time is not limited, it is preferred that the rear surface of the stamper be dried for around 30 minutes or longer at normal temperature or in the range from around 10 minutes to 30 minutes by an oven or the like.

Thereafter, dust and unevenly coated boundary lubricant film agent are removed from the rear surface of the stamper by non-volatile solvent that does not dissolve the boundary lubricant film agent. It is preferred to select a solvent with which the boundary lubricant film agent is wiped and that does not dissolve it depending on the type of phosphate ester. If a dissolvable solvent is used, the lubricant film formed on the rear surface of the stamper is wiped and removed. Thus, frictional reduction effect as an expected surface treatment effect may not be obtained. When the rear surface of the stamper is cleaned with a non-dissolvable solvent, the surface lubricant film can be smoothened.

Method of Treating Mirror Surface

Next, a method of treating the signal mirror surface of the molding apparatus will be described. First, the signal mirror surface is degreased and cleaned with an organic solvent. More specifically, solvent is soaked into waste cloth or commercial Bemcot. The mirror surface is carefully wiped with the waste close or Bemcot. The solvent used in this case is an organic solvent such as one of kinds of ketones for example acetone, toluene, or methyl ethyl ketone or one of kinds of alcohols for example isopropyl alcohol (IPA). The type of the solvent that is used is not limited. Any solvent may be used as long as the signal mirror surface can be degreased and cleaned.

Thereafter, it is checked that the solvent has completely evaporated from the signal mirror surface. Thereafter, the boundary lubricant film agent is soaked into clean cotton such as commercial Bemcot or cloth (waste cloth) for a proper amount. The boundary lubricant film agent is equally coated on the signal mirror surface with the cotton or cloth.

After the boundary lubricant film agent has been coated on the signal mirror surface, the signal mirror surface is dried at a normal temperature (room temperature) so that the solvent completely evaporates. As a result, the boundary lubricant film agent adheres to the signal mirror surface. As a result, the boundary lubricant film is formed. The time for which the boundary lubricant film agent is dried is not limited. However, it is preferred to dry the signal mirror surface for around 30 minutes or longer at a normal temperature.

Thereafter, dust and unevenly coated boundary lubricant film agent are removed from the rear surface of the stamper by non-volatile solvent that does not dissolve the boundary lubricant film agent. It is preferred to select a solvent with which the boundary lubricant film agent is wiped and that does not dissolve it depending on the type of phosphate ester. If a dissolvable solvent is used, the lubricant film formed on the rear surface of the stamper is wiped and removed. Thus, frictional reduction effect as an expected surface treatment effect may not be obtained. When the rear surface of the stamper is cleaned with a non-dissolvable solvent, the surface lubricant film can be smoothened.

The method of treating the surface may be performed in the state that the signal mirror portion is removed from the mold or in the state that the signal mirror portion is mounted to the molding apparatus. When the surface treatment is performed for the signal mirror portion removed from the mold, it may be heated and dried by for example an oven so that the solvent evaporates. It is preferred that the temperature at which the signal mirror portion is heated and dried be around the boiling point of the dilution solvent like the treatment of the rear surface of the stamper. It is preferred that the time for which the signal mirror portion is dried be in the range from 10 minutes to 30 minutes. The method for treating the surface can be easily performed at the production site of optical discs without necessity of long time and much labor. In other words, since the time for the surface treatment can be shortened, the productivity of optical discs can be improved.

As described above, according to the second embodiment, the rear surface, which is the opposite of the signal surface, of the stamper for optical discs is abraded in a predetermined manner. The rear surface is chemically treated so that a boundary lubricant film is formed thereon. Thereafter, the signal mirror surface of the molding apparatus is chemically treated so that a boundary lubricant film is formed thereon. As a result, the friction between the molding apparatus and the rear surface of the stamper mounted on the signal mirror surface can be reduced in comparison with that of the first embodiment. Thus, the time for which the facility is stopped can be shortened in comparison with that of the first embodiment. As a result, the time for which the optical discs are successively produced can be prolonged in comparison with that of the first embodiment.

Next, the present invention will be more specifically described with examples. However, the present invention is not limited to these examples.

In the following examples, injection molding was performed in the following conditions with respect to resin temperature, mold temperature, and mold clamping force.

Resin temperature: 380° C.±10° C.
Mold temperature: 125° C.±3° C.
Mold clamping force: 35 t to 40 t In the following examples, a mixture containing mono-phosphate ester, di-phosphate ester, and a small amount of tri-phosphate ester given by the foregoing chemical formula (1), chemical formula (2), and chemical formula (3), respectively, was used (made by Toho Chemical Industry Co., LTD). R' in the chemical formula (1) was H type. Carbon number of the chemical formula (1), chemical formula (2), and chemical formula (3) was m=18. The average molecule number of EO was n=2.

Phosphate ester that composes the boundary lubricant film used in these examples of the present invention is dissolvable in a solvent such as toluene, benzene, or methyl ethyl ketone (MEK). In other words, when this boundary lubricant film agent is used, it can be diluted with these dissolvable solvents.

Phosphate ester that composes the boundary lubricant film used in these examples of the present invention is non-dissolvable in a solvent such as xylene, solvent naphtha, kerosene, ethanol, DFM (dimethylformamide), butylcellosolve, ethylene glycol monomethyl ether, diethylene glycol monomethyl ether, ethyl acetate, acetone, or water. In other words, when this boundary lubricant film agent is used, after it is coated, by wiping foreign matter such as dust and unevenly coated boundary lubricant film agent with such non-dissolvable solvent, the boundary lubricant film 1 can be formed very thinly with a very equal thickness.

Example 1

The boundary lubricant film agent was diluted with toluene to a concentration of 5 wt %. The prepared boundary lubricant film agent was directly coated on the mirror surface of the stationary mirror 21 on which the hard film 2 was formed by waste cloth. DLC was used as the hard film 2. As the stationary mirror 21, FLMAX, which is high alloy cavity/core material produced with the concept of stainless, was used. After the boundary lubricant film agent was coated on the mirror surface, foreign matter such as dust and unevenly coated boundary lubricant film agent were wiped with acetone. In these steps, the boundary lubricant film 1 was very thinly formed with an equal thickness on the mirror surface of the stationary mirror 21.

Thereafter, the average roughness (Ra) on the center line of the mirror surface was measured by a non-contact type surface tester. The measured results denote that the average roughness (Ra) on the center line of the mirror surface before the boundary lubricant film 1 was formed was 0.52 (nm) and that the average roughness (Ra) on the center line of the mirror surface after the boundary lubricant film 1 was formed was 0.53 (nm). Thus, it was cleared that the average roughness on the center line of the mirror surface before the boundary lubricant film 1 was formed was nearly the same as that after the boundary lubricant film 1 was formed.

Example 2

To compare frictional force that occurred between the stationary mirror 21 and the stamper 22 before the boundary lubricant film 1 was formed with that after the boundary lubricant film 1 was formed, the boundary lubricant film 1 was formed on a sample of the stationary mirror 21. The frictional force that occurred before the boundary lubricant film 1 was formed and the frictional force that occurred after the boundary lubricant film 1 was formed were measured by a friction tester.

The material of the sample was the same as that of the stationary mirror 21 of the example 1, namely ELMAX, which is high alloy cavity/core material produced with the concept of stainless. The hard film 2 made of DLC was formed on the mirror surface. The boundary lubricant film 1 was formed on the mirror surface of the sample on which the hard film 2 was formed in the same manner as the example 1.

Figure 7:
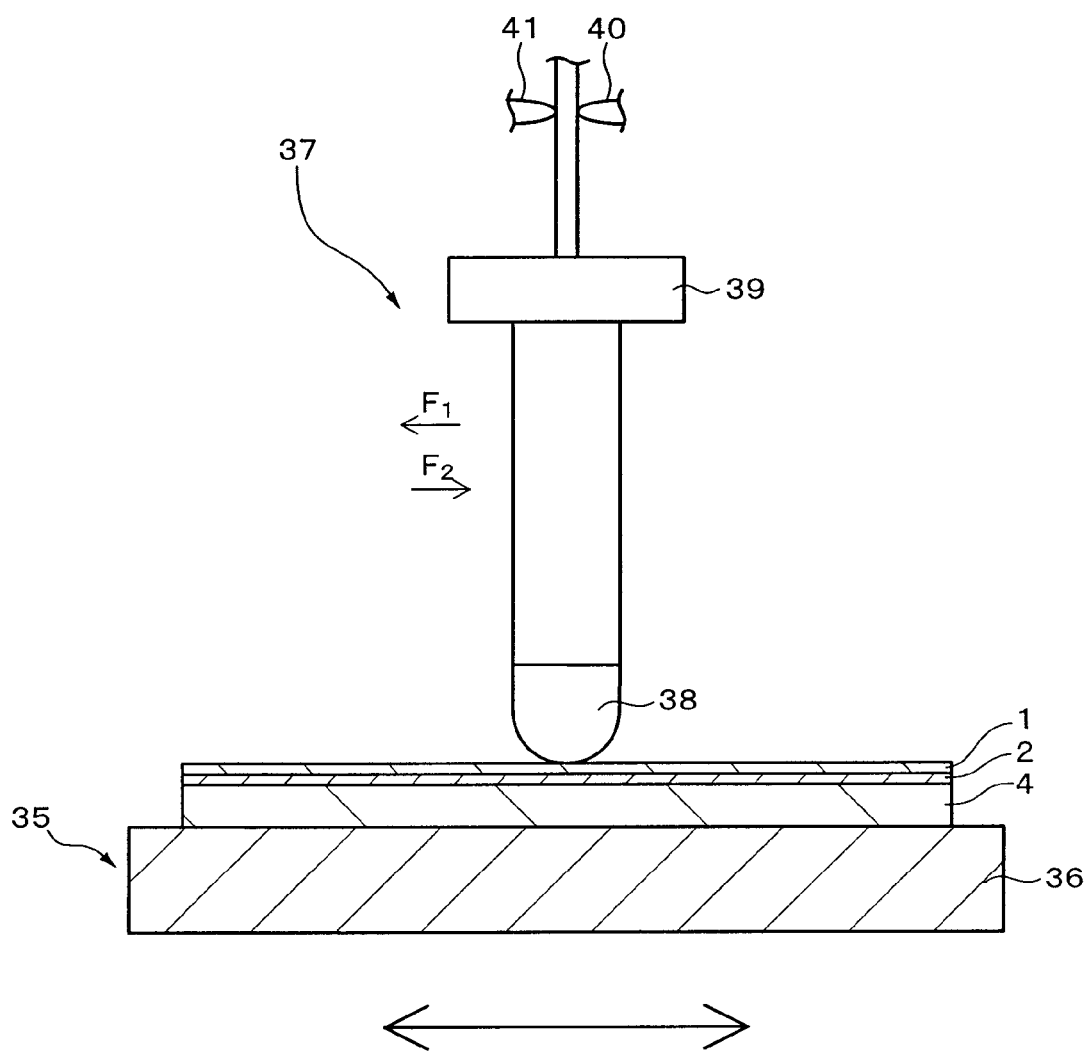
FIG. 7 is a schematic diagram describing calculation of a frictional coefficient by a friction tester.

Next, with reference to FIG. 7, a method of calculating the frictional coefficient using the friction tester will be described. The friction tester has a holding table section 35 and a detecting section 37. The holding table section 35 has a stage 36 and a drive section (not shown). The stage 36 has a holding surface on which a sample 4 is placed. The sample has a mirror surface having a diameter of 50 mm. The drive section moves the stage 36 so that the sample 4 placed on the stage 36 radially moves in parallel with the holding surface.

The detecting section 37 has a head 38 and a load stage 39. The detecting section 37 can be freely approached to and separated from the stage 36. When the frictional force is measured, the head 38 is contacted with the sample 4 on the stage 36 so as to generate frictional force against the sample 4. To calculate the frictional coefficient between the sample 4 and the stamper 22, the material of the head 38 was nickel, which is widely used as the material of the stamper 22.

The load stage 39 causes the head 38 to press the sample 4 on the stage 36. The load that the load stage 39 applies to the head 38 can be freely changed.

Sensors 40 and 41 measure the pressure applied to the detecting section 37 in the moving directions of the stage 36 to measure the frictional force that occurs between the sample 4 on the stage 36 and the head 38. The sensor 40 detects a pressure F1 applied to the detecting section 37 when the stage 36 moves in the right direction in the drawing. The sensor 41 detects a pressure F2 applied to the detecting section 37 when the stage 36 moves in the left direction in the drawing.

A frictional coefficient $\mu$ was calculated in the following manner. The pressure F1 and pressure F2 were measured while the stage 36 was moved by the drive section (not shown) so that the sample 4 on the stage 36 was moved in the radial directions one time in one second. With the measured pressure F1 and pressure F2 and the weight w of the head 38 that applied the sample 4 as the weight of the load stage, the frictional coefficient $\mu$ was calculated according to the following formula (1). It was assumed that the weight w of the head applied to the sample 4 was 65 [g].

$$\mu=((F1+F2)/2)/w \quad (1)$$

When the boundary lubricant film 1 was not formed, the pressure F1 was 17.6 g and the pressure F2 was 14.4 g. In other words, when the boundary lubricant film 1 was not formed, the frictional coefficient μ was around 0.246.

When the boundary lubricant film 1 was formed, the pressure F1 was 14.4 g and the pressure F2 was 11.6 g. In other words, when the boundary lubricant film 1 was formed, the frictional coefficient μ was 0.2.

As a result, it was clear that when the boundary lubricant film 1 that contacted the stamper 22 of the stationary mirror 21 was formed, the frictional coefficient between the stationary mirror 21 and the stamper 22 could be remarkably decreased.

Thereafter, optical disc substrates according to the 3.5-inch MO disc standard were successively molded by the molding apparatus 11. 3.5-inch MO discs were produced from the molded optical disc substrates. Thereafter, it was evaluated whether data could be recorded and reproduced to and from the produced 3.5-inch MO discs with record densities ranging from at least 1× density to 20× density.

Example 3

In the same manner as the example 1, the boundary lubricant film 1 was formed on the mirror surface of the stationary mirror 21 of the molding apparatus 11. Optical disc substrates were successively molded by the molding apparatus 11. Thereafter, a record film and a protection film according to the 3.5-inch MO disc standard were formed on the molded optical disc substrates. As a result, desired optical discs were obtained.

<Comparison 1>

Optical disc substrates were molded in the same manner as the example 3 except that the boundary lubricant film 1 was not formed. Thereafter, a record film and a protection film according to the 3.5-inch MO disc standard were formed on the molded optical disc substrate. As a result, desired optical discs were obtained.

Figure 8:
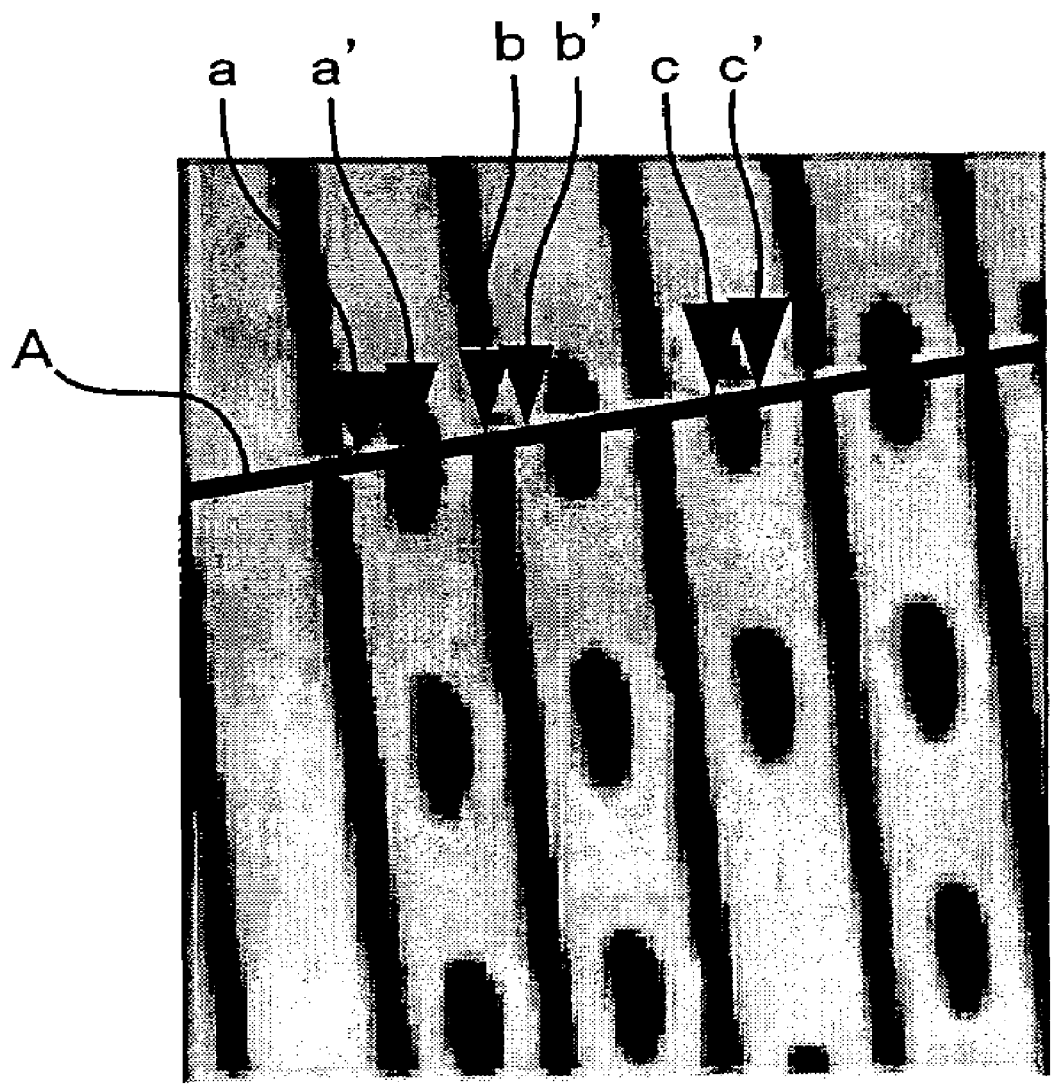
FIG. 8 is a schematic diagram showing shapes of pits in the case that there is no boundary lubricant film.
Figure 9:
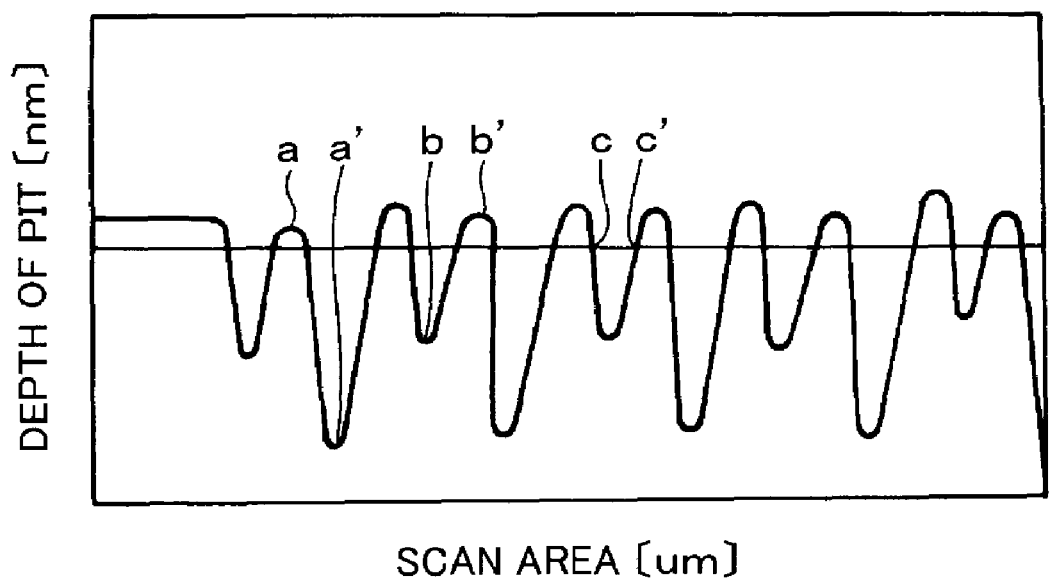
FIG. 9 is a schematic diagram showing a signal corresponding to shapes of pits in the case that there is no boundary lubricant film.
Figure 10:
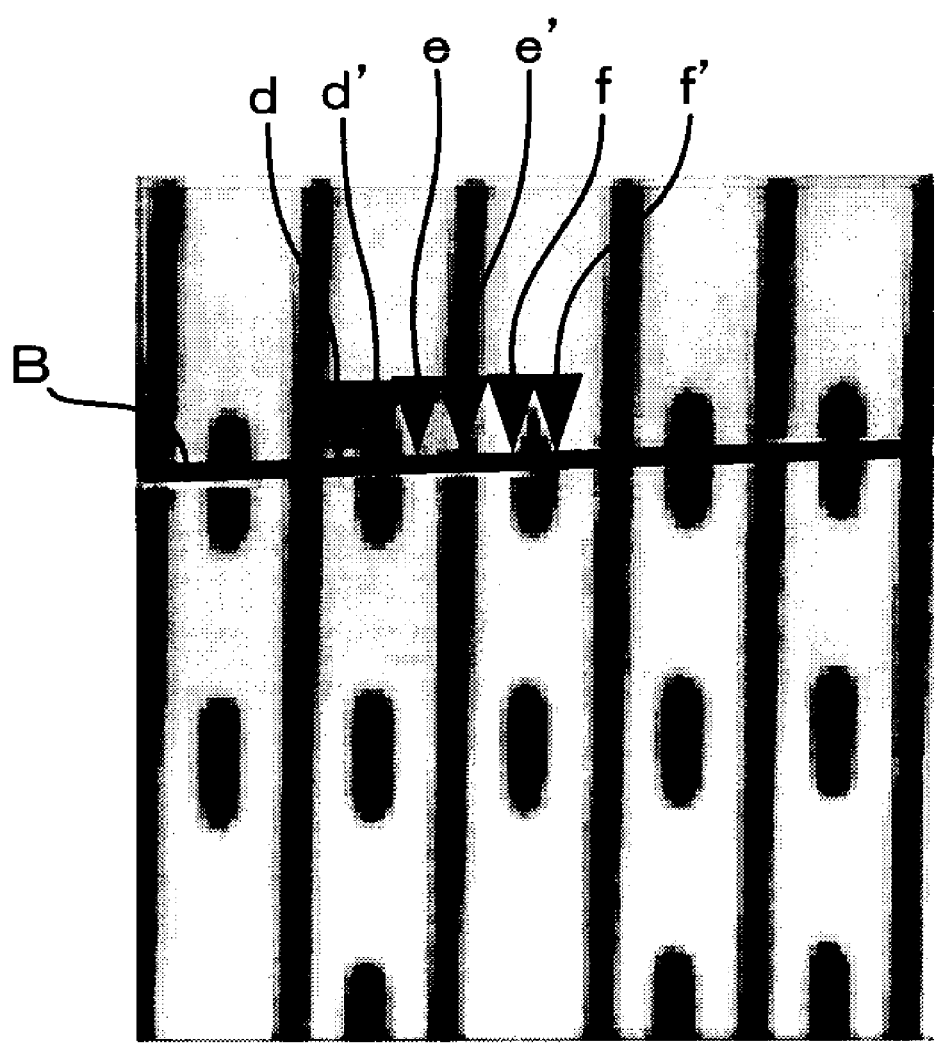
FIG. 10 is a schematic diagram showing shapes of pits in the case that there is a boundary lubricant film.
Figure 11:
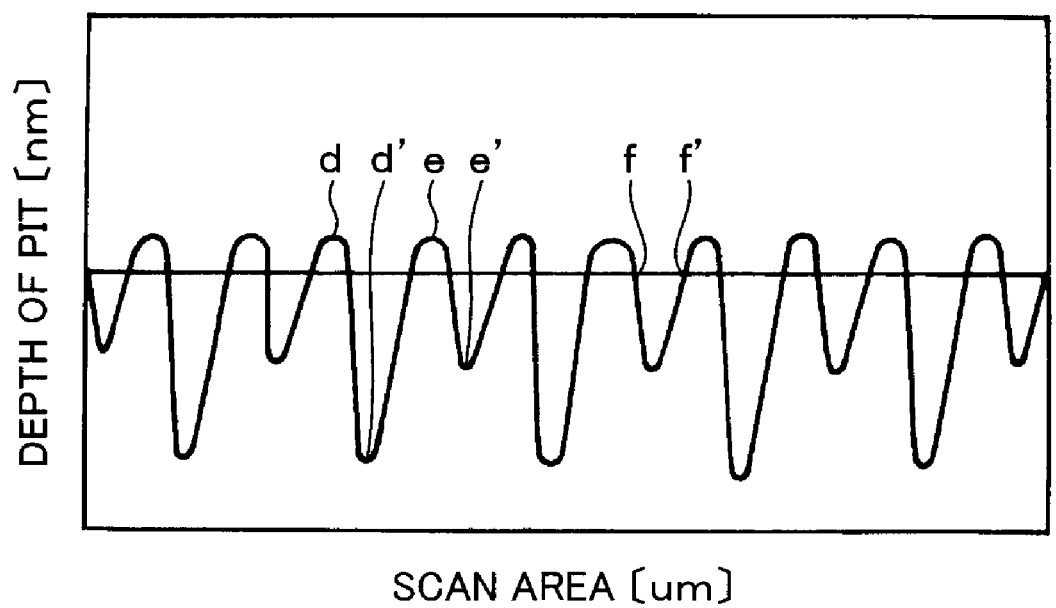
FIG. 11 is a schematic diagram showing a signal corresponding to shapes of pits in the case that there is a boundary lubricant film.

FIG. 8 and FIG. 9 show concave and convex shapes of address pits formed by a molding apparatus that does not have the boundary lubricant film 1 after the molding apparatus was used for 20,000 shots. FIG. 10 and FIG. 11 show concave and convex shapes of address pits formed by a molding apparatus that has the boundary lubricant film 1 after the molding apparatus was used for 40,000 shots.

FIG. 8 and FIG. 10 are schematic diagrams showing shapes of address pits photographed by an AFM (Atomic Force Microscope). The vertical axis of FIG. 9 and FIG. 11 denotes the depth [nm] of address pits, whereas the horizontal axis denotes the scan area [μm] in the radial directions of the substrate. In other words, FIG. 9 and FIG. 11 successively show concave and convex shapes of front surfaces with voltages and frequencies proportional to concave and convex shapes on a line A of FIG. 8 and a line B on FIG. 10. Arrows a and a', arrows b and b', and arrows c and c' of FIG. 8 correspond to points a and a', points b and b', and points c and c' of FIG. 9, respectively. In addition, arrows d and d', arrows e and e', and arrows f and f' of FIG. 10 correspond to points d and d', points e and e', and points f and f' of FIG. 11, respectively.

As shown in FIG. 8 and FIG. 9, after the molding apparatus that did not have the boundary lubricant film 1 was used for 20,000 shots, the edges of pits on a disc collapsed and address error occurred. In contrast, as shown in FIG. 10 and FIG. 11, after the molding apparatus that had the boundary lubricant film 1 was used for 40,000 shots, the edges of pits on a disc did not collapse and no address error occurred. In other words, it was clear that the productivity could be improved more than twice.

Thereafter, optical disc substrates according to the write-once type DVD 4.7 GB standard were molded by the molding apparatus 11. DVD-R discs were really produced from the molded optical disc substrates. It was evaluated whether data could be recorded and reproduced on and from the produced DVD-R discs with record speeds ranging from 1× speed to 8× speed.

Example 4

In the same manner as the example 1, the boundary lubricant film 1 was formed on the mirror surface of the stationary mirror 21 of the molding apparatus 11. Optical disc substrates were successively molded by the molding apparatus 11. Thereafter, a record film according to the write-once type DVD 4.7 GB standard was formed on the molded optical disc substrates. Thereafter, optical disc substrates were adhered with an adhesive layer. As a result, desired optical discs were obtained.

<Comparison 2>

In the same manner as the example 4, optical disc substrates were successively molded except that the boundary lubricant film 1 was omitted. Thereafter, a record film according to the write-once type DVD 4.7 GB standard was formed on the molded optical disc substrates. Thereafter, optical disc substrates were adhered with an adhesive layer. As a result, desired optical discs were obtained.

Figure 12:
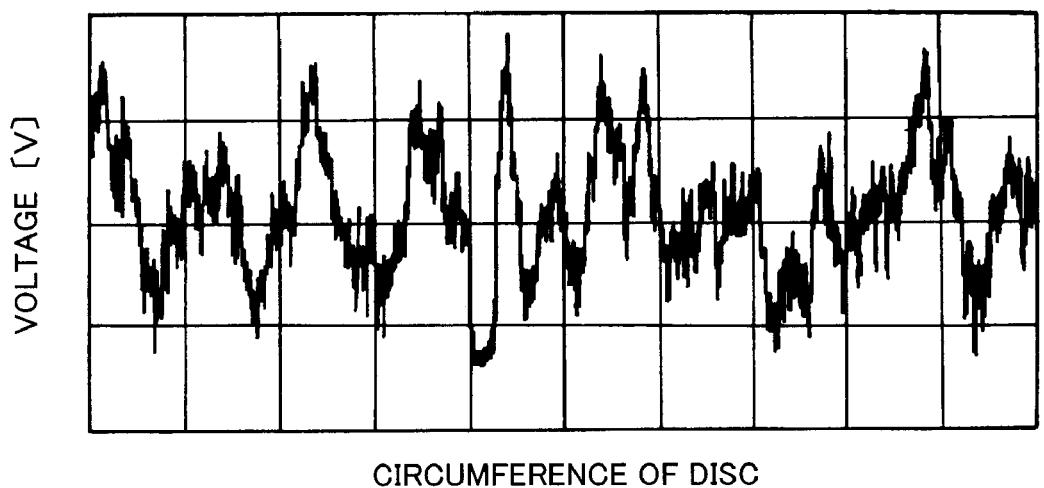
FIG. 12 is a schematic diagram showing a tracking error signal in the case that there is no boundary lubricant film.
Figure 13:
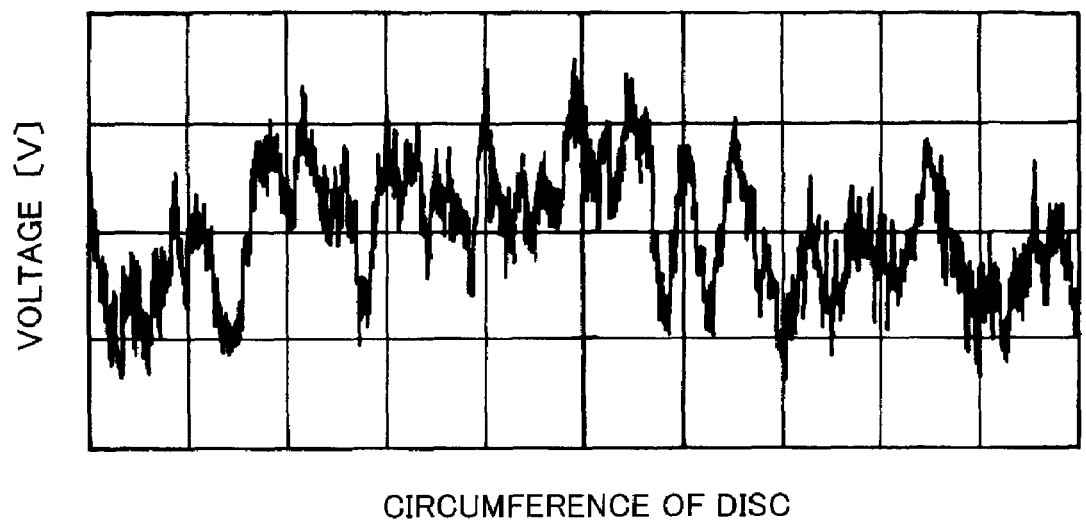
FIG. 13 is a tracking error signal in the case that there is a boundary lubricant film.

FIG. 12 shows a tracking error signal of a disc molded by the molding apparatus that does not have the boundary lubricant film 1 on the stationary mirror 21. FIG. 13 shows a tracking error signal of a disc molded by the molding apparatus having the boundary lubricant film 1 on the stationary mirror 21. The vertical axis of FIG. 12 and FIG. 13 denotes voltages, whereas the horizontal axis thereof denote circumference (0° to 360°) at a position of R58 mm, which is the outermost periphery of the signal area of the disc.

As shown in FIG. 12 and FIG. 13, the average amplitude of the tracking error signal of a disc molded by the molding apparatus having the boundary lubricant film 1 on the stationary mirror 21 is smaller than that of a disc molded by the molding apparatus that does not have the boundary lubricant film 1 on the stationary mirror 21. Thus, it was clear that when the boundary lubricant film 1 was formed on the stationary mirror 21, the tracking error decreased by around 10% and that the quality and yield of products improved.

Figure 14:
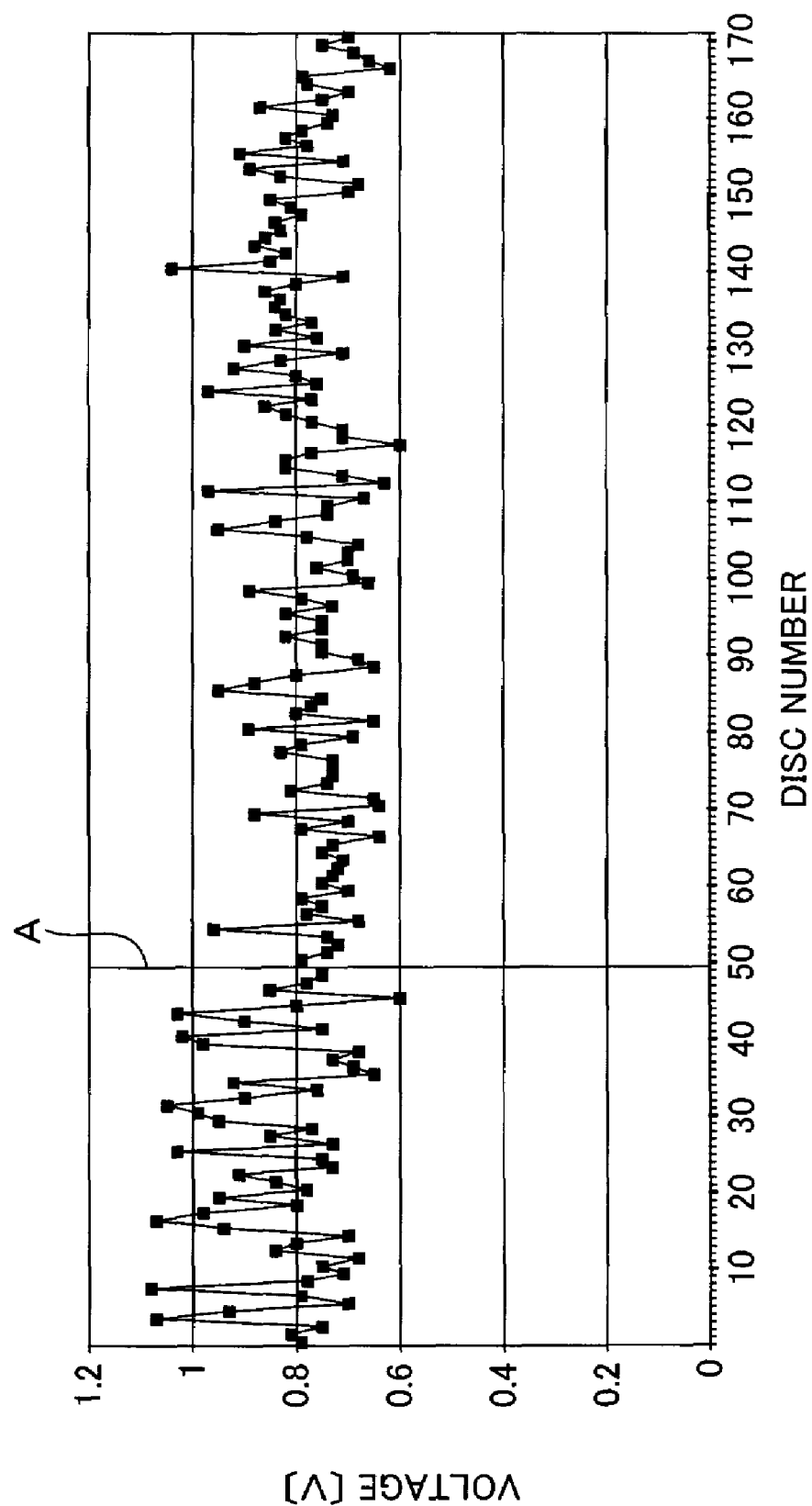
FIG. 14 is a schematic diagram showing tracking errors in the case that discs are successively molded.
Figure 15:
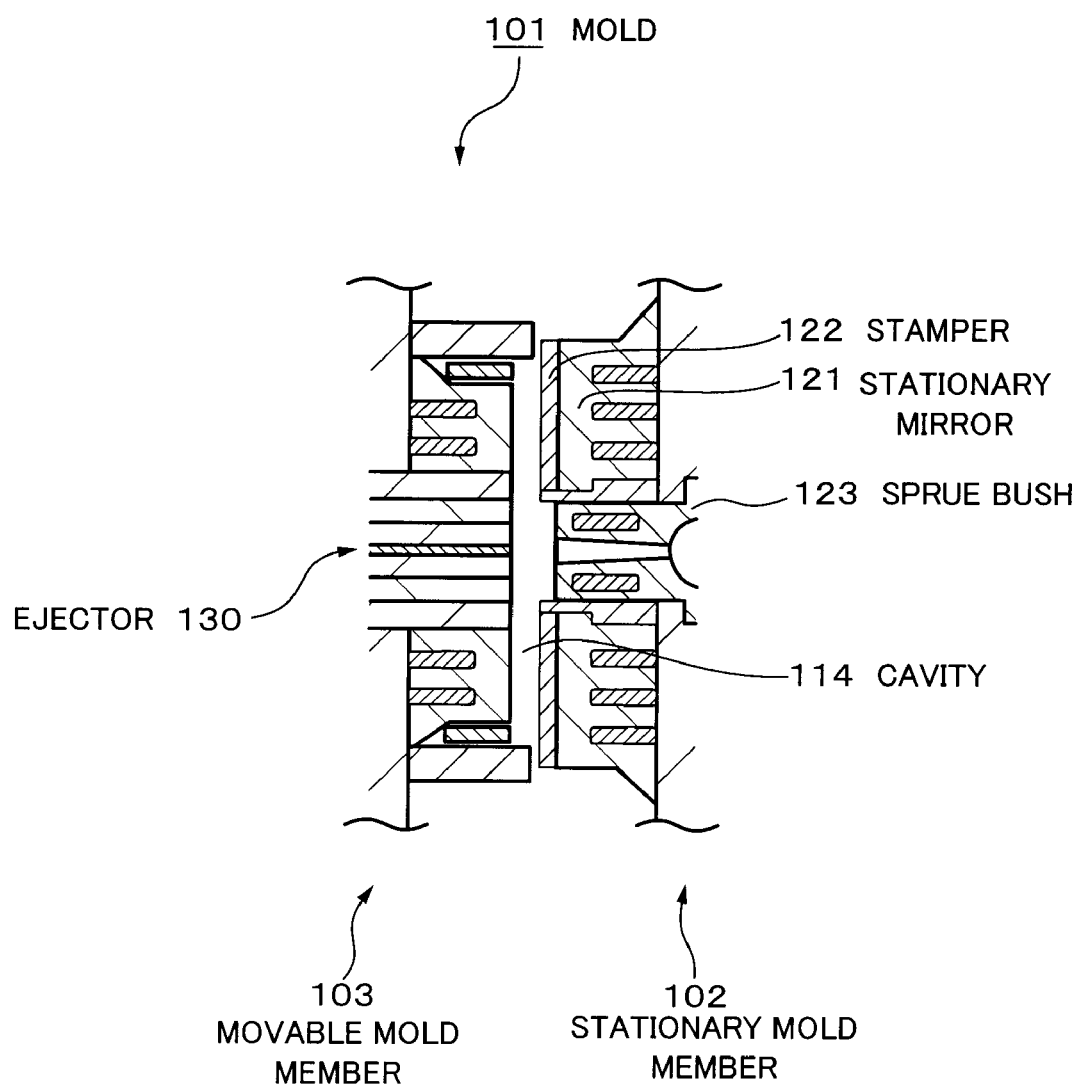
FIG. 15 is a sectional view showing an example of a structure of an optical disc substrate forming mold of related art.

FIG. 14 shows tracking errors in the case that discs are successively molded. The vertical axis of FIG. 14 denotes voltages [V], whereas the horizontal axis thereof denotes disc sample numbers. A voltage value that denotes a tracking error is the average value of tracking errors of each disc. In other words, the lower the voltage value is, the higher the tracking state is. A boundary line A in FIG. 14 denotes timing at which the boundary lubricant film 1 was formed. In other words, the left side of the boundary line A denotes discs molded before the boundary lubricant film 1 was formed. In contrast, the right side of the boundary line A denotes discs molded after boundary lubricant film 1 was formed.

The average value of the amplitudes of the tracking error signal before the boundary lubricant film 1 was formed was 0.84±0.13, whereas the average value of the amplitudes of the tracking error signal after the boundary lubricant film 1 was formed was as small as 0.77±0.08. Thus, it was clear that when discs were successively molded, the tracking errors were reduced.

Thus, according to the first embodiment of the present invention, when optical disc substrates are formed with the stationary mirror 21 on which the boundary lubricant film 1 that contacts the stamper 22 is formed, optical discs can be effectively produced at low cost with high quality. In particular, when high density 3.5-inch MO discs are produced by the molding apparatus according to the first embodiment, address errors due to dragging of pits can be remarkably reduced. As a result, the productivity can be improved more than two times.

Example 5

First, a master stamper according to the DVD-R (16×) standard was produced in the following manner. The front surface of a disc-shaped glass master as a substrate with which a stamper was produced was scrubbed by a dedicated abrading unit using fine abrasive. Thereafter, the glass master was cleaned so that no abrasive remained. As a result, a glass substrate having a flat surface was obtained.

Thereafter, a photoresist layer was formed on the front surface of the glass substrate that had been abraded and cleaned. The photoresist layer was radiated with a laser beam. A master pattern of the stamper which transferred the signal pattern to optical discs was exposed with the laser beam. Thereafter, the master pattern was developed. As a result, the master pattern was obtained. The pattern of the signal surface was spiral pre-grooves. The track pitch width was 0.74 μm and the groove depth was in the range from 0.14 μm to 0.16 μm.

A metal base layer was formed on the master pattern by electroless plating. Thereafter, an electroplate film was formed for a desired stamper thickness by electrolyte plating. The thickness of the electroplate film was 0.3 mm.

Thereafter, the plated metal film on which the signal pattern (master pattern) had been copied was separated from the glass master. The photoresist layer was dissolved with a dedicated solvent. The plated metal film was cleaned and fully dried. As a result, the master for the stamper was obtained.

A protection sheet was adhered on the signal pattern surface of the stamper. Thereafter, the rear surface of the stamper was abraded so as to improve the flatness. The rear surface of the stamper was abraded by a dry type abrading unit using an abrasion disc.

Finally, the stamper was punched and trimmed for a desired stamper diameter (138 mm). As a result, a desired stamper was obtained.

Thereafter, boundary lubricant film agent was produced in the following manner. Phosphate ester (made by Toho Chemical Industry Co., LTD) and toluene as a diluent were placed in a screw tube, mixed, and gently shaken several times. Thereafter, the tube was rotated on a roll mill for around 10 minutes. As a result, the boundary lubricant film agent was produced.

The composition of the boundary lubricant film agent is as follows.

Boundary lubricant film agent: phosphate ester (100% solid) powder, 5 parts by weight Dilution solvent: toluene, 95 parts by weight Thereafter, the rear surface of the stamper produced in the foregoing manner was degreased and cleaned with acetone. As a result, a dust-free clean surface was obtained. Thereafter, the boundary lubricant film agent that was produced in the foregoing manner was soaked into waste cloth for a proper amount. The boundary lubricant film agent was directly coated on the rear surface of the stamper with the waste cloth. The stamper was dried for 30 minutes at a normal temperature. As a result, toluene as a solvent was fully evaporated. Thus, the boundary lubricant film agent adhered on the rear surface of the stamper. As a result, the boundary lubricant film was formed. Thereafter, dust and unevenly coated boundary lubricant film agent were wiped from the boundary lubricant film with acetone. Acetone is an evaporate solvent that is not dissolvable in boundary lubricant film agent. As a result, the stamper having a desired boundary lubricant film formed on the rear surface was obtained.

Next, the appearance, deterioration of roughness, slip angle, solvent resistance, and contact angle of the rear surface of the stamper that was obtained in the foregoing manner were evaluated.

Thereafter, in the same manner as the foregoing stamper, a boundary lubricant film was formed on the signal mirror surface of the mold of the injection molding apparatus. Thereafter, the stamper having the boundary lubricant film formed on the rear surface was mounted on the mold. Optical disc substrates were repeatedly injection-molded. With the injection-molded optical disk substrates, the stamper life was evaluated.

Example 6

In the same manner as the example 5, a stamper was produced. Thereafter, boundary lubricant film agent was produced in the following manner. Fluoride modified phosphate ester (Daikin Industries, LTD) and hydrofluoroether (made by Sumitomo 3M LTD) as a diluent were placed in a screw tube, mixed, and gently shaken several times. Thereafter, the tube was rotated on a roll mill for around 10 minutes. As a result, boundary lubricant film agent was produced.

The composition of the boundary lubricant film agent is as follows.

Boundary lubricant film agent: fluoride modified phosphate ester (100% solid), 0.93 parts by weight Dilution solvent: hydrofluoroether, 99.07 parts by weight Thereafter, a boundary lubricant film was formed on the rear surface of the stamper in the same manner as the example 5 except that the boundary lubricant film agent produced in the foregoing manner was used. Thereafter, the appearance, deterioration of roughness, slip angle, solvent resistance, and contact angle of the rear surface of the stamper produced in the foregoing manner were evaluated.

In the same manner as the foregoing stamper, a boundary lubricant film was formed on the signal mirror surface of the mold of the injection molding apparatus. Thereafter, the stamper having the boundary lubricant film formed on the rear surface was mounted on the mold. Optical disc substrates were repeatedly injection-molded. With the injection-molded optical disc substrates, the stamper life was evaluated.

Example 7

In the same manner as the example 6, a stamper having a boundary lubricant film formed on the rear surface of the signal surface was produced. Thereafter, the appearance, deterioration of roughness, slip angle, solvent resistance, and contact angle of the rear surface of the stamper were evaluated. The stamper having the boundary lubricant film formed on the rear surface was mounted on the mold that did not have the boundary lubricant film on the signal mirror surface.

Optical disc substrates were repeatedly injection-molded. With the injection-molded optical disc substrates, the stamper life was evaluated.

Example 8

In the same manner as the example 5, a stamper was produced. Thereafter, in the same manner as the example 6, a boundary lubricant film was formed on the signal mirror surface. The appearance, deterioration of roughness, solvent resistance, and contact angle of the signal mirror surface were evaluated. Thereafter, a stamper that did not have a boundary lubricant film was mounted on a mold having a boundary lubricant film formed on the signal mirror surface. Thereafter, optical disc substrates were repeatedly injection-molded. With the injection-molded optical disc substrates, the stamper life was evaluated.

Example 9

In the same manner as the example 6 except that a master stamper according to the BD-R standard was used, a stamper having a boundary lubricant film formed on the rear surface was produced. Thereafter, the appearance, deterioration of roughness, slip angle, solvent resistance, and slip angle of the rear surface of the stamper were evaluated. Thereafter, in the same manner as the example 6, a boundary lubricant film was formed on the signal mirror surface. Thereafter, the stamper having the boundary lubricant film formed on the rear surface was mounted on a mold. Optical disc substrates were repeatedly injection-molded. With the injection-molded optical disc substrates, the stamper life was evaluated.

<Comparison 3>

In the same manner as the example 5, a stamper according to the DVD-R standard was produced. In the state that a boundary lubricant film was not formed on the rear surface of the stamper, namely in the normal state, the appearance, deterioration of roughness, slip angle, solvent resistance, and contact angle of the rear surface of the stamper were evaluated. Thereafter, the stamper that did not have the boundary lubricant film on the rear surface was mounted on a mold that did not have a boundary lubricant film on the signal mirror surface. Optical disc substrates were repeatedly injection-molded. With the injection-molded optical disc substrates, the stamper life was evaluated.

<Comparison 4>

In the same manner as the example 9, a stamper according to the BD-R standard was produced. In the state that a boundary lubricant film was not formed, namely, in the normal state, the appearance, deterioration of roughness, slip angle, solvent resistance, and contact angle of the rear surface of the stamper were evaluated. Thereafter, the stamper that did not have the boundary lubricant film on the rear surface was mounted on a mold that did not have a boundary lubricant film on the signal mirror surface. Optical disc substrates were repeatedly injection-molded. With the injection-molded optical disc substrates, the stamper life was evaluated.

<Comparison 5>

In the same manner as the example 5, a stamper was produced. Thereafter, the rear surface of the stamper was treated with normally dry type fluoride resin (made by Fluoro Technology LTD, trade name: FluoroSurf FG-5030G). Thereafter, the appearance, deterioration of roughness, slip angle, solvent resistance, and contact angle of the rear surface of the stamper were evaluated. As a result, the solvent resistance was bad. When the rear surface was wiped with Bemcot or waste cloth that soaked acetone, fluoride resin treated on the rear surface was removed. In addition, it was clear that since interference fringes appeared, it was difficult to use fluoride to injection-mold optical disc substrates. Thus, in the comparison 5, the stamper life was not evaluated with injection-molded optical disc substrates.

<Comparison 6>

In the same manner as the example 5, a stamper was produced. Thereafter, the rear surface of the stamper was treated with PTFE (Polytetrafluoro-ethylene), which is a solid lubricant of normal temperature hardening type. Thereafter, the appearance, deterioration of roughness, slip angle, solvent resistance, and contact angle of the rear surface of the stamper were evaluated. As a result, it was clear that since the deterioration of surface roughness was bad, the surface roughness was transferred to the signal surface of an optical disc substrate. Thus, in the comparison 6, the stamper life was not evaluated with injection-molded optical disk substrates.

Next, the evaluation results of appearance, deterioration of roughness, slip angle, solvent resistance, and contact angle in the examples 5 to 9 and the comparisons 3 to 6 will be described.

(Evaluation of Appearance)

A surface treated with a boundary lubricant film was gently wiped several times with Bemcot or waste cloth. Thereafter, it was visually observed whether the surface changed. The case that it was not observed that the surface changed is denoted by "○", the case that although it was observed that the surface slightly changed, it was in an allowable range is denoted by "Δ", the case that it was observed that the surface changed and the appearance deteriorated is denoted by "▲", and the case that it was clearly observed that the surface changed and a disc substrate that satisfied the DVD-R and BD-R standards could not be produced (hereinafter referred to as not-applicable as a product) is denoted by "x". When the appearance of the surface is "○" or "Δ", disc substrates that satisfy the DVD-R and BD-R standards can be satisfactorily produced.

(Evaluation of Surface Roughness)

The surface roughness was measured by a commercial two-dimensional surface roughness tester. It was evaluated whether surface parameters (Ra, Rmax, and Rz) changed before and after a boundary lubricant film was formed and whether the surface roughness was being deteriorated. The case that the it was observed that the surface parameters did not change or the surface roughness was not being deteriorated is denoted by "○", the case that it was observed that the surface roughness slightly changed but in an allowable range is denoted by "Δ", the case that it was observed that the surface roughness changed is denoted by "▲", and the case that it was clearly observed that the surface roughness changed and was not applicable as a product is denoted by "X". When the surface roughness is "○" or "Δ", disc substrates that satisfy the DVD-R and DVD-R standards can be satisfactorily produced.

(Evaluation of Slip Angle)

A stamper having a boundary lubricant film treated thereon was gently placed on a flat table in a manner that the rear surface faced upward. A weight of 200 g was placed on the rear surface of the stamper. One end of the stamper was gradually tilted upward. The angle at which the weight starts moving is defined as the slid angle. By definition, the slip angle is evaluated instead of static friction. The smaller the slip angle is, the lower the friction is. In this evaluation, only the rear surface of the stamper was measured. Since the slip angles of materials used in these examples were very low, the slip angles of the mirror surfaces were observed by another evaluation method. It can be said that the lower the slip angle is, the higher and more preferable the frictional reduction effect is.

(Evaluation of Solvent Resistance)

A surface treated with a boundary lubricant film was lightly wiped with Bemcot or waste cloth that soaked acetone several times. Thereafter, it was visually observed whether the surface changed. The case that it was observed that the surface did not change is denoted by "○", the case that it was observed that the surface slightly changed but in an allowable range is denoted by "Δ", the case that it was observed that the surface changed is denoted by "▲", and the case that it was observed that the surface clearly changed and was not applicable as a product is denoted by "X". When the solvent resistance is "○" or "Δ", disc substrates that satisfy the DVD-R standard can be satisfactorily produced.

The solvent resistance is evaluated assuming that an ordinary molding process is performed. Before a stamper is mounted on a mold, the signal mirror surface and the rear surface of the stamper are wiped and cleaned with acetone to prevent dust on the signal mirror surface from adversely affecting the stamper and foreign matter from being transferred to the signal mirror surface of the stamper. However, when they are cleaned, boundary lubricant film agent treated thereon may be dissolved and removed therefrom. As a result, the effect may be lost.

When solvent resistance of one sample is compared with that of another sample, it is most suitable to compare the contact angle before a surface is wiped with acetone with that after a surface is wiped therewith. However, to speedily determine the solvent resistance at production site, a surface may be observed after it is wiped. The solvent resistance may be observed depending on whether interference fringes appear thereon, acetone remains in a drip shape after a surface is wiped, or it is covered with acetone. In other words, the solvent resistance can be visually observed depending on whether a wetting characteristic of solvent has changed. The solvent resistance is evaluated by visually observing whether a wetting characteristic has changed. As a preferred state, although the solvent resistance depends on the structure of the boundary lubricant film agent, according to the present invention, when the boundary lubricant film is made of fluoride modified phosphate ester, it is preferred that the boundary lubricant film repeal and intersperse solvent in a drip shape.

(Evaluation of Contact Angle)

As a simple method of determining whether boundary lubricant film agent has been securely treated on the surface, a contact angle is ordinarily measured. The angle is measured by dripping droplets of pure water or hexadecane on a surface to determine whether the property of the surface is hydrophilic or oleophilic depending on the molecule structure of a chemical substance (boundary lubricant film agent) treated on the surface. According to these examples, the contact angle in the case of which the quantities of liquid droplets of pure water and hexadecane are 3.1 μl was measured by a FACE solid surface energy analyzing unit (CA-XE type) made by Kyowa Interface Science Co., LTD. However, this evaluation aimed to determine whether boundary lubricant film agent had been bound to the rear surface of the stamper or the signal mirror surface rather than whether the quality of boundary lubricant film agent was good or bad. When the contact angle before the surface is treated is different from that after the surface is treated, it is assumed that the surface has been treated.

(Evaluation of Life Performance)

The evaluation of life performance denotes a substantial effect of the present invention. In other words, the life performance is a performance of a real optical disc production line. The higher the life value (number of shots) is, the higher the effect is.

In this specification, the life denotes the number of optical discs (shots) that can be successively molded in one molding operation rather than the life of the stamper.

As was described earlier, since the material of the rear surface of the stamper is different from the material of the signal mirror portion, frictional wear that causes their boundary to deform due to difference of thermal expansion coefficients and rigidity moduli of these materials. At this point, adhesion wear occurs in the rear surface of the stamper whose hardness is lower than the signal mirror portion due to friction. Since the adhered substance or lost substance acts like abrasive, it damages the rear surface of the stamper and the front surface of the signal mirror portion. As a result, the accuracy of molded discs would deteriorate. Thus, the facility is temporarily stopped. The rear surface of the stamper is lightly abraded and reused. This maintenance work causes the facility operating ratio to decrease and the production cost to increase. This is an important problem that the present invention overcomes.

As a criterion for which the stamper life has expired or the molding facility is stopped, it is determined that the stamper life should have expired (one operation of the molding facility should have expired) when a measured tracking error of an optical disc exceeds a predetermined value. The tracking errors of optical discs were measured by a servo error tester, which is a Sony's unique in-company standard evaluation tester. When the tracking error exceeds a standard value of 450 mV against an initial value of 350 to 400 mV, it is determined that the stamper life should have expired and the molding operation and the molding apparatus should be stopped. It is not necessary to explain that the larger the value (number of shots) is, the more preferable the stamper life is.

Table 1 shows the evaluation results of the examples 5 to 9 and the comparisons 3 to 6.

TABLE 1

| | Object of treatment | Surface treatment agent | Evaluation of appearance | Deterioration of roughness | Slip angle [°] | Solvent resistance | Contact angle [°] Pure water | Contact angle [°] Hexadecane | Life performance |
|---|---|---|---|---|---|---|---|---|---|
| Ex 5 | Rear surface of stamper + signal mirror surface | Phosphate ester | ○ | ○ | 18 | ○ | 96 | <10 | 40,000 |

TABLE 1-continued

| | | | | | | Contact angle [°] | | |
|---|---|---|---|---|---|---|---|---|
| | Object of treatment | Surface treatment agent | Evaluation of appearance | Deterioration of roughness | Slip angle [°] | Solvent resistance | Pure water | Hexadecane | Life performance |
| Ex 6 | Rear surface of stamper + signal mirror surface | Fluoride modified phosphate ester | ○ | ○ | 3 | ○ | 113 | 64 | 96,000 |
| Ex 7 | Only rear surface of stamper | Fluoride modified phosphate ester | ○ | ○ | 3 | ○ | 113 | 64 | 47,000 |
| Ex 8 | Only signal mirror surface | Fluoride modified phosphate ester | ○ | ○ | — | ○ | 103 | 47 | 42,000 |
| Ex 9 | Rear surface of stamper + signal mirror surface | Fluoride modified phosphate ester | ○ | ○ | 3 | ○ | 113 | 64 | 80,000 |
| Com 3 | No treatment | No treatment | — | — | 30 | — | 85 | 11 | 20,000 |
| Com 4 | No treatment | No treatment | — | — | 30 | — | 85 | 11 | 20,000 |
| Com 5 | Only rear surface of stamper | Fluoride resin of normal temperature dry type | ▲ | ○ | 22 | x | 105 | 58 | Not applicable |
| Com 6 | Only rear surface of stamper | Solid lubricant PTFE | x | x | 7 | ○ | 110 | 32 | Not applicable |

The evaluation results in Table 1 denote the following.

When the evaluation results of life performance in the examples 5 to 9 and the evaluation result of life performance in the comparison 3 are compared, it is clear that when a surface lubricant film is formed on at least one of the rear surface of the stamper and the signal mirror surface, the stamper life (the number of shots) can be remarkably prolonged in comparison with the case that no surface lubricant film is formed on both the rear surface of the stamper and the signal mirror surface.

When the evaluation result of the life performance of the example 6 is compared with the evaluation results of the life performance of the examples 7 and 8 are compared, it is clear that when a surface lubricant film is formed on both the rear surface of the stamper and the signal mirror surface, the stamper life (the number of shots) can be doubled in comparison with the case that a surface lubricant film is formed on either the rear surface of the stamper or the signal mirror surface. In other words, from a view point of which the stamper life (the number of shots) is prolonged (increased), it is clear that it is preferred to form a surface lubricant film on both the rear surface of the stamper and the signal mirror surface.

When the evaluation result of the life performance of the example 5 and the evaluation result of the life performance of the example 6 are compared, it is clear that a surface lubricant film made of fluoride modified phosphate ester allows friction to decrease and the stamper life to be prolonged in comparison with a surface lubricant film made of phosphate ester. In addition, it is clear that to prolong the stamper life, it is important to decrease friction between the rear surface of the stamper and the signal mirror, which holds the stamper of the mold of the molding apparatus. In the injection molding step for optical discs, to obtain an optical disc production stamper that has a long stamper life satisfying characteristics necessary for optical discs such as tracking error and that does not decrease the facility operating ratio, the method according to the present invention can overcome these problems.

The evaluation result of slip angle in Table 1 preformed to evaluate the frictional reduction effect is a guideline with which friction on the rear surface of the stamper is determined. Thus, it implies that when a surface is chemically treated in a particular manner, the friction can be decreased.

This specification describes only the examples 1 to 9 and the comparisons 1 to 6 for convenience. However, the inventors of the present invention intensively evaluated other various boundary lubricant film agents to accomplish the present invention. According to the evaluation results, most of these boundary lubricant film agents did not work. When a treated surface was wiped with organic solvent such as acetone, a pattern such as interference fringes occurred, which deteriorated the evaluation result of appearance. When a treated surface was wiped with solvent, boundary lubricant film agent was lost. Thus, the effects of the boundary lubricant film agents were not obtained. To simply decrease friction, although silicone surface active agents, resins, and so forth are effective, they are dissolvable in a solvent for example one of kinds of ketones such as acetone or toluene or one of kinds of alcohols such as ethyl alcohol or IPA (isopropyl alcohol). Thus, when the mold of the molding apparatus is cleaned, since boundary lubricant film agent is lost, it is not preferred to use silicone surface active agents, resins, and so forth.

As important points in evaluating other surface active agents, resins, and so forth, when surface-treated boundary lubricant film agent is wet like oil, the boundary lubricant film agent absorbs dust. As a result, a problem of which foreign matter is transferred occurs. When optical disc substrates are molded at high temperature under high pressure, since there is a risk of which these boundary lubricant film agents flow to the signal surface, the use of these boundary lubricant film agents may be permitted.

On the other hand, in the comparison 5, to decrease friction, a solid lubricant that has a large frictional reduction effect is used instead of a surface active agent or a resin. However, although it can be easily supposed from Table 1, after a surface is treated, the surface roughness deteriorates. It is concerned that roughness that exceeds a real use range of the stamper is transferred to the signal surface. In addition, a small amount of dust was observed on a treated surface. Thus, it is difficult to practically use the sold lubricant.

As the foregoing results, with a boundary lubricant film formed on the rear surface of the stamper and the signal mirror surface of the mold of the molding apparatus, friction can be decreased and the stamper life can be prolonged without deterioration of the surface roughness of the rear surface of the stamper and the signal mirror surface of the mold of the molding apparatus.

To accomplish the present invention in a higher level, namely to decrease friction between the rear surface of the stamper and the signal mirror portion, it is preferred to use as boundary lubricant film agent that is surface-treated a phosphate ester that is a surface active agent having a lubricative characteristic, that has a phosphoric acid radical in a base, and that has a structure given by chemical formula (1), in particular, fluoride modified phosphate ester given by chemical formula (4). This is because it has an excellent frictional reduction effect and can more prolong the stamper life than others.

In addition, as a benefit of the present invention, the boundary lubricant film agent can be repeatedly used. If the effect of the boundary lubricant film agent becomes weak, when the rear surface of the stamper and the signal mirror surface are cleaned and then the boundary lubricant film is treated thereon, the effect can be maintained.

In addition, as a matter regardless of a problem solving factor, when the front surface of the stamper and the signal mirror surface treated with the boundary lubricant film agent are observed, they are colorless and odorless. Thus, it is difficult to know what treatment was performed on them. As a result, if the stamper is sold as a product, this property will become an advantage.

The present invention is not limited to the foregoing embodiments. Instead, without departing from the scope and sprit of the present invention, various modifications may be made.

For example, numeric values used in the foregoing embodiments and examples are just example values. When necessary, different numeric values may be used.

In the foregoing embodiments and examples, the present invention is applied to DVD-R and BD-R. However, the present invention may be applied to other write-once type optical record mediums. In addition, the present invention can be applied to reproduction-only type and recordable type optical record mediums. More specifically, the present invention may be applied to optical record mediums according to various standards such as CD-DA (Compact Disc-Digital Audio), CD-ROM (Compact Disc-Read Only Memory), CD-R (Compact Disc-Recordable), CD-RW (Compact Disc-ReWritable), DVD-R (Digital Versatile Disc-Recordable), DVD+R (Digital Versatile Disc+Recordable), DVD-RW (Digital Versatile Disc-ReWritable), DVD-RAM (Digital Versatile Disc-Random Access Memory), and DVD-ROM (Digital Versatile Disc-Read Only Memory). In addition, the present invention may be applied to next generation high density optical record mediums such as HD-DVD (High Definition Digital Versatile Disc), BD-ROM (Blu-ray Disc-Read Only Memory), BD-R (Blu-ray Disc-Recordable), and BD-RE (Blu-ray Disc-REwritable). In addition, the present invention may be applied to optical record mediums that will be developed in the near future.

In addition, the record speeds are not limited to those of the foregoing embodiments and examples. Instead, the present invention may be applied to optical record mediums having various record speeds. In addition, the number of record layers is not limited to one. Instead, the present invention may be applied to optical record mediums having two or more record layers.

In addition, according to the first embodiment, although the boundary lubricant film 1 is formed on the front surface of the stationary mirror 21, the present invention is not limited thereto. Instead, the boundary lubricant film 1 may be formed on the rear surface of the stamper 22 made of for example nickel. Instead, the boundary lubricant film 1 may be formed on both the stationary mirror 21 and the stamper 22. In addition, the hard film 2 may be formed on the rear surface of the stamper 22.

In addition, the present invention may be applied to molding of not only a 3.5-inch MO disc and a DVD-R, but other record medium substrates that use substrates on which a convex and concave shape is transferred by a stamper. In addition, the present invention may be applied to a production of molded articles of which a concave and convey shape of the stamper is transferred.

Moreover, in the foregoing embodiments and examples, the material of the stamper is not limited. For example, besides nickel, another metal or ceramic may be used. In this case, the same effects as the first and second embodiments may be obtained.

In the foregoing embodiments and examples, the material of the signal mirror portion is not limited. For example, diamond-like-carbon called DLC may be formed in the signal mirror portion. In this case, the same effects as the first and second embodiments may be obtained.

In the foregoing embodiments and examples, the case of which fluoride modified phosphate ester is formed as a boundary lubricant film on the signal mirror surface of the molding apparatus and the rear surface of the stamper. However, applications of fluoride modified phosphate ester are not limited to these embodiments and examples. Instead, fluoride modified phosphate ester may be widely applied to a lubricant composition that provides lubricative characteristic by a frictional reduction effect. In addition, applications of fluoride modified phosphate ester are not limited to a lubricant composition that provides lubricative characteristic by a frictional reduction effect. Instead, fluoride modified phosphate ester may be used for various applications such as a water proof agent composition that provides a water proof function by water repellent, an antifoulant composition that provides an antifoulant function by oil repellent, an anticorrosive composition that provides an anticorrosion function by water and oil repellents, and a solvent resistant composition that provides solvent resistance. Next, these applications will be described.

(1) Providing Lubricative Characteristic by Frictional Reduction Effect

Phosphate ester is known as an extreme pressure additive. Since phosphate ester has heat resistance, it is used to reduce friction for articles under high temperature environment. Phosphate ester may be used for a sliding portion and a driving portion of the molding apparatus besides the signal mirror surface of the optical disc molding apparatus. In particular, phosphate ester can be effectively used to reduce friction of a dry sliding portion or a dry driving portion that is protected against splash of oil and grease. Specific examples of these portions used in the optical disc molding apparatus are a gate cut punch, a product ejector sleeve, a product ejector pin, an outer peripheral ring, and ball bearings used for these portions. In addition, phosphate ester may be used for a bearing of a mold aligning guide post, extension portions of the stationary mold member and the movable mold member, a tie bar of the molding apparatus, and a read mirror surface.

In the foregoing, an optical disc molding apparatus was exemplified. However, the present invention may be applied to other injection type molding apparatuses. In addition, the same effect may be expected for all molding members. The examples of the molding members are a pressing mold, a pouring mold, an injection mold, a transfer mold, a vacuum mold, an air blowing mold, a pushing die, an inflation molding mouthpiece, a fiber mouthpiece, and a calender machining roll. On the other hand, from a view point of a decrease of friction of a high speed sliding portion, it is expected that when the sliding portion slides at high speed, frictional heat occurs. In this case, extreme pressure additive can be effectively used. Specifically, a magnetic tape is exemplified. A magnetic tape that contacts a video head rotating at high speed and to which data are recorded and from which data are reproduced contains lubricant. Phosphate ester has an excellent effect on a lubricant for a magnetic tape. In particular, a metal evaporated tape, which has become the mainstream of magnetic tapes, uses a characteristic of which fluoride modified phosphate ester is chemically absorbed into metal. Although fluoride modified phosphate ester may be contained in the metal evaporated tape, when fluoride modified phosphate ester is formed as a top layer on the metal evaporated film, fluoride modified phosphate ester is present as a very-thin absorption film on the front surface of a cobalt evaporated film. As a result, an excellent frictional reduction effect can be obtained.

(2) Providing Water Proof Function Using Water Repellency

As values of contact angles of water or hexadecane in evaluation items of examples and comparisons that were described above, a surface treated with fluoride modified phosphate ester has sufficient water and oil repellency. This property and characteristic effectively work in every field. The water repellent effect provides a water proof function. When fluoride modified phosphate ester is coated on the front surface of glass or mirror, fluoride modified phosphate ester works as an antifog agent. This applies to lenses of a camera and glasses and mirrors in high humidity environment for example a bathroom and a washstand. As an advanced application, when fluoride modified phosphate ester is coated on front and rear glasses of a car, the driver can have a clear sight and safely drive the car on a rainy day. As long as the material of an article on which fluoride modified phosphate ester is coated is a metal, ceramic, or glass, the article can have a water proof function. An example of a product that has necessity for water repellency is a head of an ink jet printer. An ink jet printer uses water-based inks. An ink jet printer sprays fine droplets from very small nozzle openings. The material of the nozzle portion is a metal. It is preferred that the nozzle portion that sprays droplets have hydrophobicity. In other words, the nozzle portion has necessity for a water repellent characteristic. If the nozzle portion has a good wetting characteristic against water, before the nozzle portion sprays droplets, ink spreads in the nozzle portion. As a result, droplets are not formed. Thus, they are not properly sprayed. Since the droplets are not sprayed onto an object to be printed, a print defect occurs. To properly spray droplets, the nozzle portion has necessity for a good water repellency. Thus, when the nozzle portion is treated with fluoride modified phosphate ester, a very thin hydrophobic film is formed on the surface of the metal of the nozzle portion. As a result, since water can be properly repelled, the spraying performance of ink droplets can be remarkably improved. This effect can be applied to any of discharging type, piezo type, and bubble jet type. Although the nozzle portion may be treated with fluoride modified phosphate ester, it may be contained in an ink itself as an ink composition. In particular, in the bubble jet type, when fluoride modified phosphate ester is contained in an ink, a merit with respect to the spraying method of the bubble jet type can be obtained. A bubble jet type printer mainly uses a metal heater that forms droplets and that is made of tantalum. Since high temperature is applied to the metal heater, a problem called cogation occurs. In other words, scorch of ink composition adheres on the surface of the metal. This scorch prevents the nozzle portion from being heated. Thus, it becomes difficult for the nozzle portion to form droplets. When fluoride modified phosphate ester is added as an ink composition to the ink, fluoride modified phosphate ester is surface-treated on the heater through the ink. As a result, while the heat resistance is obtained as a characteristic of fluoride modified phosphate ester, since a chemical absorption film is formed, the cogation preventing effect can be obtained. When fluoride modified phosphate ester is treated on plastic, the effect may become weak, not lost. In this case, after the surface of plastic is hydrophilically treated, when fluoride modified phosphate ester is coated thereon, the same effect can be obtained.

(3) Providing Antifouling Function Using Oil Repellency

When a surface of an article is treated with fluoride modified phosphate ester, both water repellency and oil repellency are obtained. This property and characteristic are effective for an anti-fouling function. As a specific example, when fluoride modified phosphate ester is coated on a read surface of an optical disc or a hard coat layer on a record surface, as a fingerprint adhesion suppression effect, the surface can be very easily wiped. In addition, the coating of fluoride modified phosphate ester prevents dust from adversely extending on the front surface. Likewise, as was described in the water proof function, oily dust can be easily wiped from a lens of a camera, glasses, and a glass surface of a watch, which have necessity for visual clearness. In addition, when accessories made of a metal, glass, or ceramic is placed in an oily environment of which there is oily mist such as a kitchen and in an indoor smoking environment, they become dirty with oil and tar of cigarettes. If they are left for a long time, dust adheres on their surfaces. In this case, it becomes difficult to clean them. As a result, they are discolored. With respect to such a problem, fluoride modified phosphate ester is very effective for the anti-fouling function.

(4) Providing Anti-Rusting Function Using Water and Oil Repellency

As was described above, since a very thin chemical absorption film is formed through a phosphoric acid radical on the front surface of metal due to the structure of phosphate ester, fluoride modified phosphate ester has an anti-rusting function against rust. The front surface of the treated fluoride modified phosphate ester is colorless and transparent. Thus, fluoride modified phosphate ester does not deteriorate the appearance of the treated surface. If an accessory made of a metal has necessity for rust resistance, when the accessory is coated with fluoride modified phosphate ester, the appearance of the accessory is not deteriorated for a long time and it has a anti-rusting function. In addition, fluoride modified phosphate ester can be applied to metal articles such as a screw, a bolt, a nut, and a nail that have a problem of rust as well as accessories.

(5) Providing Solvent Resistance

Although fluoride modified phosphate ester is dissolvable in a fluoride solvent, it is not dissolvable in an organic solvent such as one of kinds of ketones for example acetone, toluene, or methyl ethyl ketone (MEK) or one of kinds of alcohols for example IPA, ethyl alcohol, or methyl alcohol. In a clean environment such as a clean room, dust and contaminant are mainly cleaned with solvent. When a molding apparatus that works under high pressure catches foreign matter, the shape is transferred. Thus, the molding apparatus is daily wiped and cleaned with volatile organic solvent. In this case, if a surface treated with one of many surface active agents is wiped with solvent, the surface treated agent may be lost with the solvent. In this case, when the surface is treated with fluoride modified phosphate ester, the surface repels many solvents other than a fluoride solvent. Thus, fluoride modified phosphate ester can be effectively used.

It should be understood by those skilled in the art that various modifications, combinations, sub-combinations and alternations may occur depending on design requirements and other factors insofar as they are within the scope of the appended claims or the equivalents thereof.

DESCRIPTION FOR REFERENCE NUMERALS

1 BOUNDARY LUBRICANT FILM
2 HARD FILM
11 MOLDING APPARATUS
10 DISC SUBSTRATE
12 STATIONARY MOLD MEMBER
13 MOVABLE MOLD MEMBER
14 CAVITY
15 GUIDE POLE
21 STATIONARY MIRROR
22 STAMPER
31 MOVABLE MIRROR

What is claimed is:

1. A method of molding an optical disc substrate, comprising the steps of:
    forming a lubricant film on a stamper contact portion of a mold and/or a mold contact portion of the stamper, the lubricant film containing a phosphate ester;
    equalizing a thickness of an agent which forms the lubricant film formed at the film forming step;
    mounting the stamper on the mold; and
    injecting a material into the mold on which the stamper has been mounted at the mounting step and molding a disc substrate,
    wherein the equalizing step is performed by wiping a front surface of the lubricant film formed at the film forming step with solvent which does not dissolve the phosphate ester.

* * * * *